US012645896B2

(12) United States Patent
Reddy et al.

(10) Patent No.: US 12,645,896 B2
(45) Date of Patent: Jun. 2, 2026

(54) ADAPTIVE VEHICLE DISPLAY BASED ON USER EQUIPMENT COMMUNICATIONS OR POSITIONING INFORMATION

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 18/531,486

(22) Filed: Dec. 6, 2023

(65) Prior Publication Data

US 2025/0190723 A1 Jun. 12, 2025

(51) Int. Cl.
G06K 19/07 (2006.01)
G06K 7/00 (2006.01)

(52) U.S. Cl.
CPC ....... G06K 7/0008 (2013.01); G06K 19/0723 (2013.01)

(58) Field of Classification Search
CPC .............. G06K 7/0008; G06K 19/0723; H04L 1/0034; H04L 1/0003; G06Q 50/265
See application file for complete search history.

(56) References Cited

U.S. PATENT DOCUMENTS 8,549,318 B2 * 10/2013 White ................ G07C 9/00563
701/1
9,162,648 B1 10/2015 Weng et al.

9,715,609 B1 * 7/2017 Fink ........................ H01Q 25/00
2004/0233040 A1 * 11/2004 Lane ...................... H04L 9/3263
340/5.86
2010/0207754 A1 8/2010 Shostak et al.
2012/0323767 A1 12/2012 Michael
2019/0202445 A1 7/2019 Lavoie et al.
2021/0276586 A1 * 9/2021 Chen ...................... G08G 1/167
2024/0303455 A1 * 9/2024 Svendsen .............. H04L 5/0051

FOREIGN PATENT DOCUMENTS

EP 4138486 A1 2/2023

OTHER PUBLICATIONS

International Search Report and Written Opinion—PCT/US2024/051454—ISA/EPO—Jan. 15, 2025.

* cited by examiner

*Primary Examiner* — Vernal U Brown
(74) *Attorney, Agent, or Firm* — Thien T. Nguyen

(57) ABSTRACT

Systems and techniques are provided for wireless communications. A process can include transmitting an energizing signal using an energizer device included in a vehicle and associated with a display of the vehicle, wherein the energizing signal is configured to interrogate one or more backscatter tags within the vehicle. A first backscatter signal can be received from a first backscatter tag of the one or more backscatter tags, the first backscatter signal based on the energizing signal and indicative of information corresponding to a driver of the vehicle. A driver status corresponding to the driver of the vehicle can be determined based on the first backscatter signal. A display message indicative of the driver status can be transmitted to the display of the vehicle for output.

27 Claims, 16 Drawing Sheets

200

250

270

LMF

266

260

5GC

AMF

SMF

UPF

264

262

265

265

263

263

220

NEW RAN

224 ng-eNB gNB

222

223

204

1200

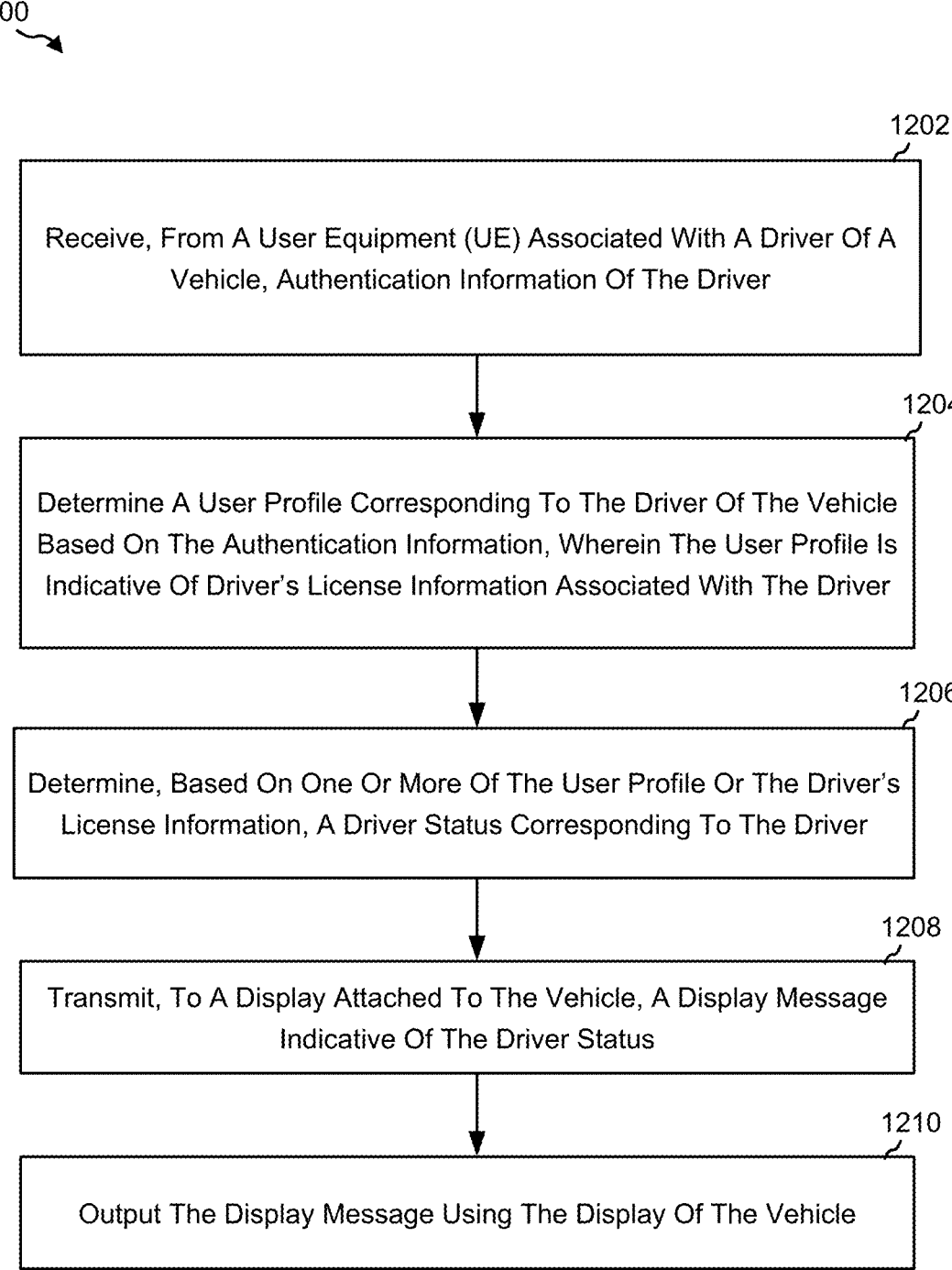

1202

Receive, From A User Equipment (UE) Associated With A Driver Of A Vehicle, Authentication Information Of The Driver

1204

Determine A User Profile Corresponding To The Driver Of The Vehicle Based On The Authentication Information, Wherein The User Profile Is Indicative Of Driver's License Information Associated With The Driver

1206

Determine, Based On One Or More Of The User Profile Or The Driver's License Information, A Driver Status Corresponding To The Driver

1208

Transmit, To A Display Attached To The Vehicle, A Display Message Indicative Of The Driver Status

1210

Output The Display Message Using The Display Of The Vehicle

FIG. 12

ADAPTIVE VEHICLE DISPLAY BASED ON USER EQUIPMENT COMMUNICATIONS OR POSITIONING INFORMATION

FIELD

The present disclosure generally relates to wireless communication. For example, aspects of the present disclosure relate to wireless communications between a vehicle display and a backscatter device (e.g., such as ambient Internet of Things (IoT) devices).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in vehicle-to-everything (V2X), vehicle-to-vehicle (V2V), and/or device-to-device (D2D) communication.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communications is provided. The method includes: transmitting an energizing signal using an energizer device included in a vehicle, wherein the energizer device is associated with a display of the vehicle, and wherein the energizing signal is configured to interrogate one or more backscatter tags within the vehicle; receiving a first backscatter signal from a first backscatter tag of the one or more backscatter tags, wherein the first backscatter signal is based on the energizing signal and is indicative of information corresponding to a driver of the vehicle; determining, based on the first backscatter signal, a driver status corresponding to the driver of the vehicle; transmitting, to the display of the vehicle, a display message indicative of the driver status; and outputting the display message using the display of the vehicle.

In another illustrative example, an apparatus for wireless communication is provided. The apparatus includes at least one memory and at least one processor coupled to the at least one memory and configured to: transmit an energizing signal using an energizer device included in a vehicle, wherein the energizer device is associated with a display of the vehicle, and wherein the energizing signal is configured to interrogate one or more backscatter tags within the vehicle; receive a first backscatter signal from a first backscatter tag of the one or more backscatter tags, wherein the first backscatter signal is based on the energizing signal and is indicative of information corresponding to a driver of the vehicle; determine, based on the first backscatter signal, a driver status corresponding to the driver of the vehicle; transmit, to the display of the vehicle, a display message indicative of the driver status; and output the display message using the display of the vehicle.

In another illustrative example, a non-transitory computer-readable storage medium is provided, comprising instructions stored thereon which, when executed by at least one processor, causes the at least one processor to: transmit an energizing signal using an energizer device included in a vehicle, wherein the energizer device is associated with a display of the vehicle, and wherein the energizing signal is configured to interrogate one or more backscatter tags within the vehicle; receive a first backscatter signal from a first backscatter tag of the one or more backscatter tags, wherein the first backscatter signal is based on the energizing signal and is indicative of information corresponding to a driver of the vehicle; determine, based on the first backscatter signal, a driver status corresponding to the driver of the vehicle; transmit, to the display of the vehicle, a display message indicative of the driver status; and output the display message using the display of the vehicle.

In another illustrative example, an apparatus is provided for wireless communication. The apparatus includes: means for transmitting an energizing signal using an energizer device included in a vehicle, wherein the energizer device is associated with a display of the vehicle, and wherein the energizing signal is configured to interrogate one or more backscatter tags within the vehicle; means for receiving a first backscatter signal from a first backscatter tag of the one or more backscatter tags, wherein the first backscatter signal is based on the energizing signal and is indicative of information corresponding to a driver of the vehicle; means for determining, based on the first backscatter signal, a driver status corresponding to the driver of the vehicle; means for transmitting, to the display of the vehicle, a display message indicative of the driver status; and means for outputting the display message using the display of the vehicle.

According to at least one illustrative example, a method of wireless communications is provided. The method includes: receiving, from a user equipment (UE) associated with a driver of a vehicle, authentication information of the driver; determining a user profile corresponding to the driver of the vehicle based on the authentication information, wherein the user profile is indicative of driver's license information associated with the driver; determining, based on one or more of the user profile or the driver's license information, a driver status corresponding to the driver; transmitting, to a display attached to the vehicle, a display message indicative of the driver status; and outputting the display message using the display of the vehicle.

In another illustrative example, an apparatus for wireless communication is provided. The apparatus includes at least one memory and at least one processor coupled to the at least one memory and configured to: receive, from a user equipment (UE) associated with a driver of a vehicle, authentication information of the driver; determine a user profile corresponding to the driver of the vehicle based on the authentication information, wherein the user profile is indicative of driver's license information associated with the driver; determine, based on one or more of the user profile or the driver's license information, a driver status corresponding to the driver; transmit, to a display attached to the vehicle, a display message indicative of the driver status; and output the display message using the display of the vehicle.

In another illustrative example, a non-transitory computer-readable storage medium is provided, comprising instructions stored thereon which, when executed by at least one processor, causes the at least one processor to: receive, from a user equipment (UE) associated with a driver of a vehicle, authentication information of the driver; determine a user profile corresponding to the driver of the vehicle based on the authentication information, wherein the user profile is indicative of driver's license information associated with the driver; determine, based on one or more of the user profile or the driver's license information, a driver status corresponding to the driver; transmit, to a display attached to the vehicle, a display message indicative of the driver status; and output the display message using the display of the vehicle.

In another illustrative example, an apparatus is provided for wireless communication. The apparatus includes: means for receiving, from a user equipment (UE) associated with a driver of a vehicle, authentication information of the driver; means for determining a user profile corresponding to the driver of the vehicle based on the authentication information, wherein the user profile is indicative of driver's license information associated with the driver; means for determining, based on one or more of the user profile or the driver's license information, a driver status corresponding to the driver; means for transmitting, to a display attached to the vehicle, a display message indicative of the driver status; and means for outputting the display message using the display of the vehicle.

In some aspects, the apparatuses or network devices described is, includes, or is part of, a vehicle (e.g., an automobile, truck, etc., or a component or system of an automobile, truck, etc.), a roadside unit (RSU) or other network-enabled infrastructure equipment (e.g., a network-enabled stoplight, etc.), a mobile device (e.g., a mobile telephone or so-called "smart phone" or other mobile device), a network-connected wearable device (e.g., a so-called "smart watch"), an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 12 is a flow chart illustrating another example of a process for wireless communication, in accordance with some examples.

DETAILED DESCRIPTION

Figure 1:
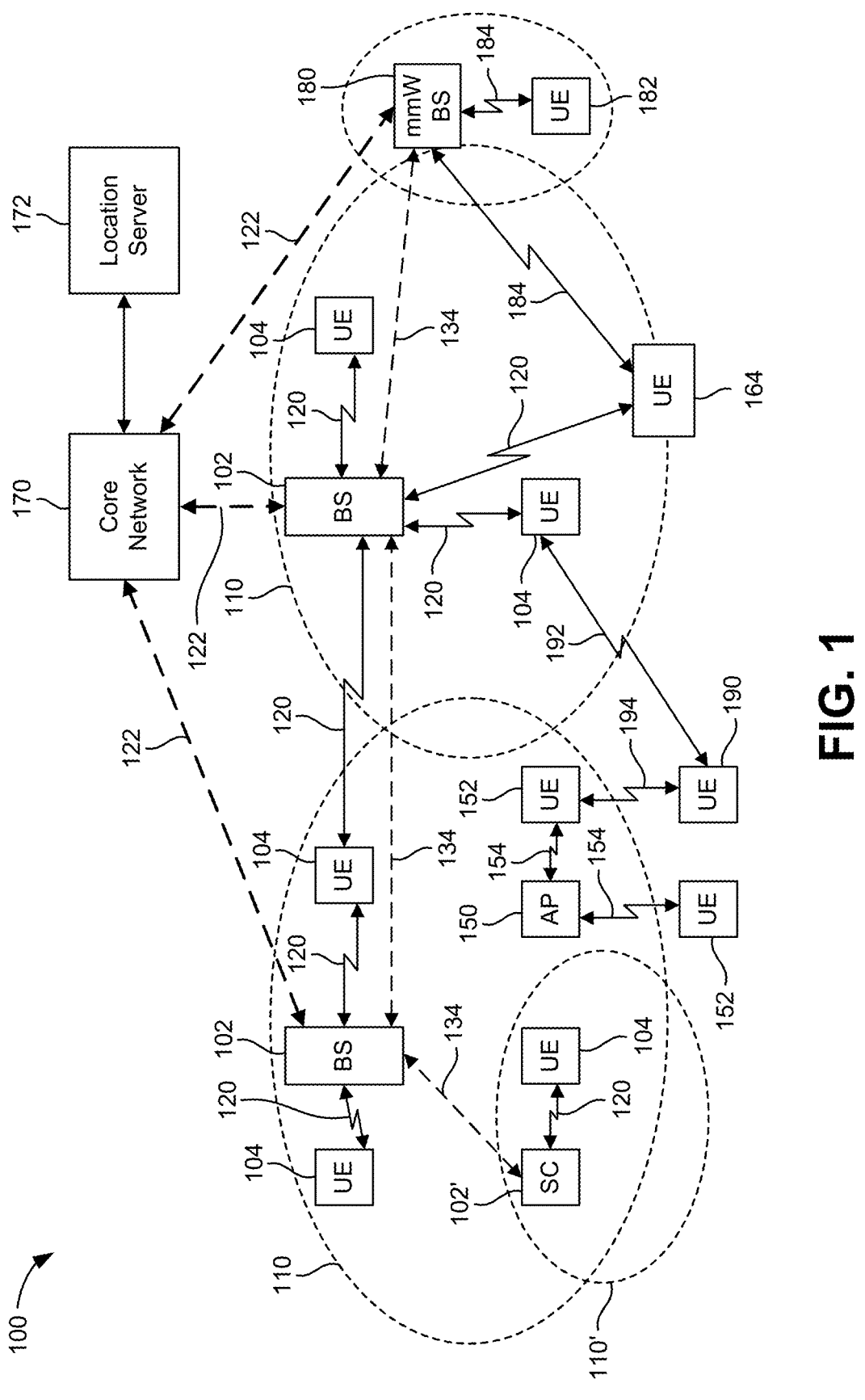
FIG. 1 is a diagram illustrating an example wireless communications system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims. The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, client devices can be utilized that may be associated with different signaling and communication needs. For example, as 5G networks expand into industrial verticals and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices, which can include passive IoT devices, semi-passive IoT devices, etc., that are configured to perform backscatter communications. In some aspects, passive IoT devices may also be referred to as "ambient IoT devices." An ambient IoT device (e.g., an AIoT device) can be an ambient-power enabled IoT device that is configured to perform RF energy harvesting from an external source of energy (e.g., ambient RF signals, etc.) and/or to perform backscatter communications based on receiving and reflecting a downlink energizing signal. An "ambient IoT device" may also be referred to as a "tag" and/or a "passive UE" (PUE). In some examples, an ambient IoT device may be an IoT device that can perform ambient energy harvesting. An ambient IoT (AIoT) device may also be referred to as an ambient energy harvesting device. As used herein, the term "ambient IoT devices" may refer to active IoT devices, passive IoT devices, and/or semi-passive IoT devices that can be used to perform ambient energy harvesting.

An ambient IoT device or other backscatter device (e.g., such as a Radio Frequency Identification (RFID) tag, a Near Field Communication (NFC) tag, etc.) can be used for short range wireless communication with a corresponding reader device. A backscatter reader may also be referred to as a backscatter interrogator, a backscatter energizer, etc. Ambient IoT and/or other backscatter tags and devices can be relatively low-cost devices, and may be used for purposes such as asset or inventor tracking, monitoring, supply chain management, etc. For example, ambient IoT and other backscatter systems can read and/or write information to and/or from (respectively) one or more tags, based on respective wireless communications between a backscatter reader and the backscatter tags. For instance, a backscatter reader (e.g., interrogator, energizer, etc.) can be used to interrogate one or more backscatter tags to obtain information of nearby items or objects that are within communication range of the backscatter reader and the interrogation signal (e.g., energizing signal). The backscatter reader can transmit a radio frequency (RF) signal to perform the energizing and interrogating of the backscatter tags. A backscatter tag that receives the interrogating RF wave can respond by transmitting another RF wave. A backscatter tag may generate the responsive RF wave originally (e.g., in examples where the backscatter tag is an active ort semi-active tag). A backscatter tag may generate the responsive RF wave passively, for instance by reflecting back a portion of the interrogating RF wave using a backscatter process (e.g., in examples where the RFID is an ambient IoT tag or other passive backscatter tag, etc.).

In some cases, a backscatter reader (e.g., an interrogator device or energizer device, etc.) can be included in or otherwise implemented by various other devices, such as a smartphone, user equipment (UE), mobile computing device, robotic device, etc. For instance, a backscatter energizer device may be configured with greater power resources than an ambient IoT device and/or backscatter tag, and may generate and transmit an energizing signal using the greater power resources to interrogate the ambient IoT tags or devices. As used herein, "interrogating" an ambient IoT tag or device may also be referred to as "scanning," "reading,", "probing," and/or "energizing" the ambient IoT tag or device. In some examples, a dedicated backscatter energizing device can be used to interrogate or read information from one or more ambient IoT or backscatter devices within range of the RF energizing signal transmitted by the backscatter energizing device. Based on being energized, an ambient IoT tag device can transmit (e.g., using a backscatter signal based on modulating and reflecting the downlink energizing signal) identifying information of the ambient IoT tag device in response. The identifying information of a respective ambient IoT tag device can be unique to the respective ambient IoT tag device (e.g., such as unique metadata or other unique identifiers assigned to each respective ambient IoT tag device of a plurality of ambient IoT tag devices).

Systems, apparatuses, processes (also referred to as methods), and computer-readable media (collectively referred to as "systems and techniques") are described herein that can be used to provide an adaptive vehicle display configured to display one or more messages corresponding to information determined based on communication(s) from one or more ambient IoT devices or other backscatter tags. For instance, the systems and techniques can provide an adaptive vehicle display configured to display one or more messages corresponding to various UE and/or backscatter device communications. In some cases, the one or more messages output on the vehicle display can be based on positioning information corresponding to or determined based on backscatter communications between a backscatter energizer associated with a vehicle and one or more ambient IoT devices or backscatter tags associated with one or more occupants of the vehicle. For instance, a first backscatter tag can be associated with (e.g., included within) a driver's license or UE carried by a driver of the vehicle. A second backscatter tag can be associated with (e.g., included within) a driver's license or UE carried by a passenger of the vehicle, etc.

In some examples, the systems and techniques can be used to perform detection of a student driver in the driver's seat of a vehicle. For instance, an ambient IoT tag may be included in the driver's license or learner's permit issued to (e.g., and carried by) the student driver, and a backscatter energizer can be included in the vehicle. In some aspects, the backscatter energizer can be coupled to and/or associated with a display that is provided on the vehicle. The display may be an outward-facing display that is visible to other vehicles and/or drivers on the road. For instance, the display can be a rear-facing display that is visible through the rear window of the vehicle and/or that is attached to the rear surface(s) of the vehicle. In some cases, the display can be an electronic ink (e.g., e-ink) or other low-power and/or persistent display. The backscatter energizer included in the vehicle can be associated with the outward-facing display of the vehicle. In some aspects, the backscatter energizer can be included in the vehicle display. The backscatter energizer can be used to interrogate or scan for the presence of an ambient IoT tag (e.g., or various other backscatter tags, such as RFID tags, NFC tags, etc.) located in or near the driver's seat of the vehicle.

In some examples, an ambient IoT tag included in the user's driver's license or learner's permit can respond to the energizing signal (e.g., from the backscatter energizer associated with the vehicle display) with a backscatter signal that is indicative of the driver's license information or other driver status identifying information of the user. For instance, the backscatter signal transmitted by the ambient IoT tag included in the user's driver's license, learner's permit, smartphone, etc., can be directly indicative of the user's driver status as a fully licensed driver, a partially licensed or qualified driver, a learner's permit driver or student driver, etc. In another example, the backscatter signal transmitted by the ambient IoT tag included in the user's driver's license, learner's permit, smartphone, etc., can transmit metadata or other unique identification information of the respective ambient IoT tag. The unique identifier of the respective ambient IoT tag can be compared to a database of stored or configured user profiles (e.g., driver profiles) associated with and accessible by the vehicle display, where the user profiles map the unique ambient IoT tag identifiers to corresponding driver status identifying information. Based on determining the respective driver status identifying information for the current driver of the vehicle, the vehicle display can be automatically configured to display or output a corresponding display message or alert that is based on the driver status identifying information. For instance, based on determining that the current driver of the vehicle is a student driver, the vehicle display can be automatically configured with a "STUDENT DRIVER" message, or various other messages indicative of the driver's status as a student driver.

In another illustrative example, the systems and techniques can be used to configure the vehicle display with one or more adaptive vehicle display messages determined based on one or more inter-vehicle measurements and/or inter-vehicle communications performed between a first vehicle (e.g., the vehicle including or associated with the vehicle display) and one or more nearby vehicles (e.g., vehicles within communication range of the vehicle including the vehicle display). In some aspects, the vehicle display provided on the first vehicle can be configured with a display message or other alert information that is determined based on one or more vehicle-to-everything (V2X) messages transmitted and/or received by the first vehicle. In some cases, the vehicle display provided on the first vehicle can be configured with a display message or other alert information that is determined based on one or more sidelink messages (e.g., NR-SL, etc.) transmitted and/or received by the first vehicle. For instance, the first vehicle and/or the one or more nearby vehicles may include radar capability to detect inter-vehicle range information, relative velocity information, etc. Based on the inter-vehicle measurements and/or the one or more V2X or NR-SL messages received by the first vehicle, the vehicle display provided on the first vehicle can be configured to display warning or alert messages to the driver(s) or occupant(s) of the one or more nearby vehicles. For instance, the outward-facing display of the first vehicle can be used to display (e.g., to the driver or occupants of a nearby vehicle) messages such as "Slow down!" or "Too close!" or "Stop!", etc., based on one or more inter-vehicle measurements and/or V2X messages between the first vehicle and the second vehicle.

Additional aspects of the present disclosure are described below with reference to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), a network-connected wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
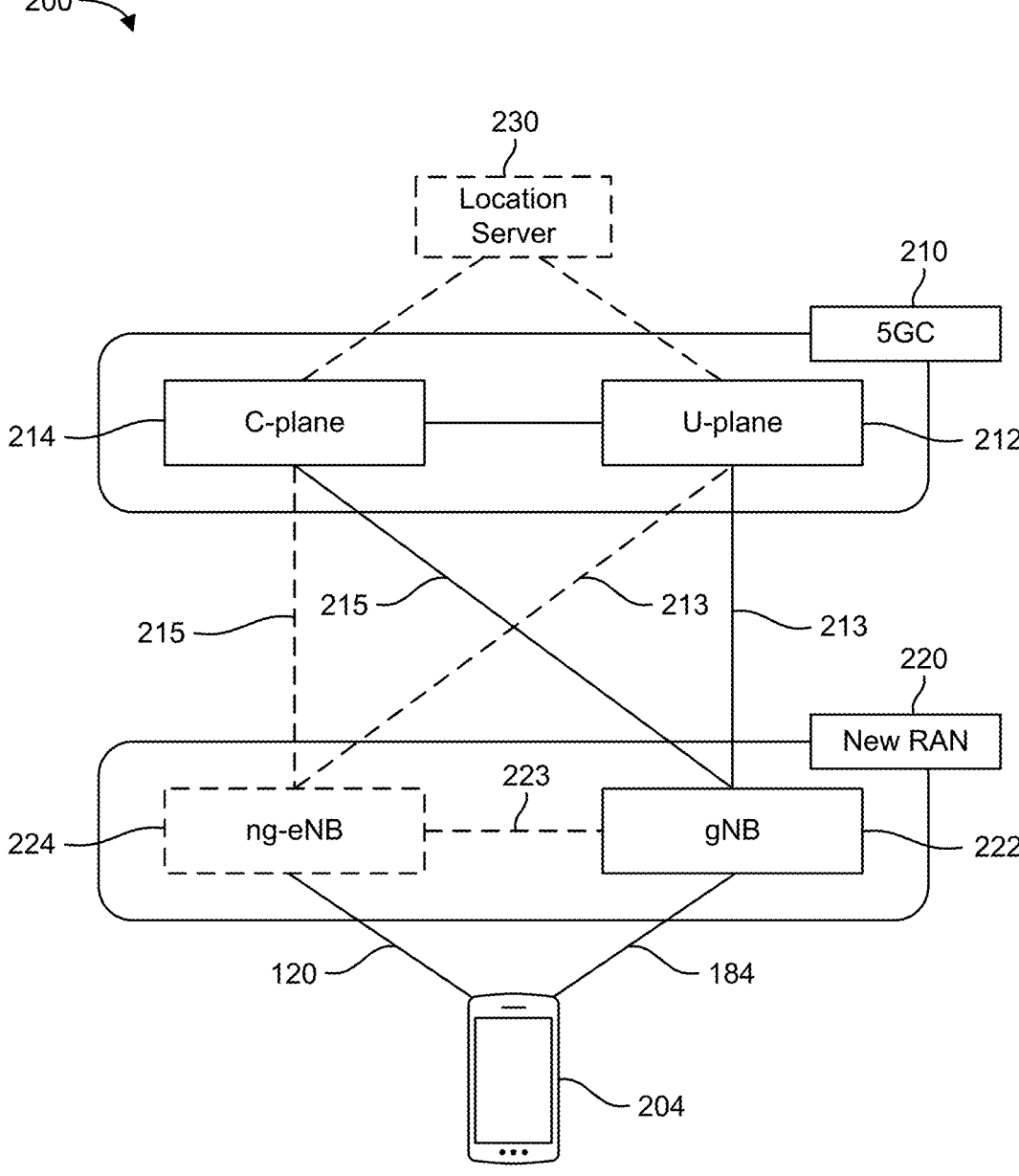
FIG. 2A and FIG. 2B illustrate examples of wireless network structures, in accordance with some examples.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server. The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 2B:

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (e.g., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204, and may receive an intermediate key established as a result of the UE 204 authentication process.

In the case of authentication based on a UMTS (universal mobile telecommunications system) subscriber identity module (USIM), the AMF 264 May retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

As described above, wireless communications systems support communication among multiple UEs. In various examples, wireless communications systems may be configured to support device-to-device (D2D) communication and/or vehicle-to-everything (V2X) communication. V2X may also be referred to as Cellular V2X (C-V2X). V2X communications may be performed using any radio access technology, such as LTE, 5G, WLAN, or other communication protocol. In some examples, UEs may transmit and receive V2X messages to and from other UEs, road side units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications may be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 360° non line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHZ), the U-NII-5 band (5.925-6.425 GHZ), the U-NII-6 band (6.425-6.525 GHz), the U-NII-7 band (6.525-6.875 GHZ), the U-NII-8 band (6.875-7.125 GHz), or any other frequency band that may be suitable for performing sidelink communications.

Figure 2C:
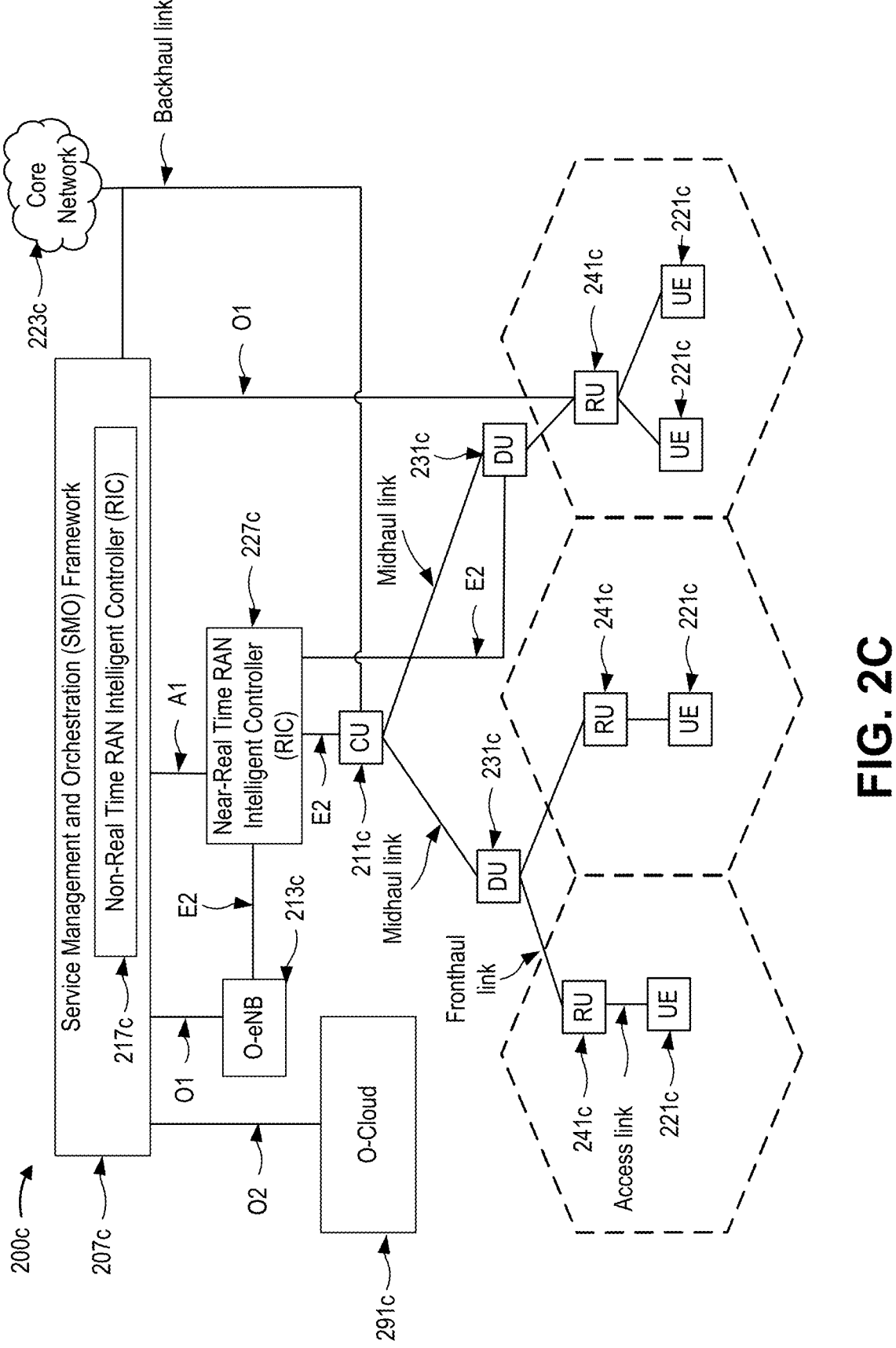
FIG. 2C is a diagram illustrating an example of a disaggregated base station architecture, in accordance with some examples.

FIG. 2C is a diagram illustrating an example of a disaggregated base station architecture, which may be employed by the disclosed system for enhanced VRU prediction through server-based processing (e.g., cloud-based processing using one or more servers), in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2C shows a diagram illustrating an example disaggregated base station 200c architecture. The disaggregated base station 200c architecture may include one or more central units (CUs) 211c that can communicate directly with a core network 223c via a backhaul link, or indirectly with the core network 223c through one or more disaggregated base station units (such as a Near-Real Time (Near-RT) RAN Intelligent Controller (RIC) 227c via an E2 link, or a Non-Real Time (Non-RT) RIC 217 associated with a Service Management and Orchestration (SMO) Framework 207c, or both). A CU 211c may communicate with one or more distributed units (DUs) 231c via respective midhaul links, such as an F1 interface. The DUs 231c may communicate with one or more radio units (RUs) 241c via respective fronthaul links. The RUs 241c may communicate with respective UEs 221c via one or more RF access links. In some implementations, the UE 221c may be simultaneously served by multiple RUs 241c.

Each of the units, e.g., the CUS 211c, the DUs 231c, the RUs 241c, as well as the Near-RT RICs 227c, the Non-RT RICs 217c and the SMO Framework 207c, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211c may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211c. The CU 211c may be configured to handle user plane functionality (e.g., Central Unit-User Plane (CU-UP)), control plane functionality (e.g., Central Unit-Control Plane (CU-CP)), or a combination thereof. In some implementations, the CU 211c can be logically split into one or more CU-UP units and one or more CU-CP units. The CU-UP unit can communicate bidirectionally with the CU-CP unit via an interface, such as the E1 interface when implemented in an O-RAN configuration. The CU 211c can be implemented to communicate with the DU 131c, as necessary, for network control and signaling.

The DU 231c may correspond to a logical unit that includes one or more base station functions to control the operation of one or more RUs 241c. In some aspects, the DU 231c may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP).

In some aspects, the DU 231*c* may further host one or more low PHY layers. Each layer (or module) can be implemented with an interface configured to communicate signals with other layers (and modules) hosted by the DU 231*c*, or with the control functions hosted by the CU 211*c*.

Lower-layer functionality can be implemented by one or more RUs 241*c*. In some deployments, an RU 241*c*, controlled by a DU 231*c*, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241*c* can be implemented to handle over the air (OTA) communication with one or more UEs 221*c*. In some implementations, real-time and non-real-time aspects of control and user plane communication with the RU(s) 241*c* can be controlled by the corresponding DU 231*c*. In some scenarios, this configuration can enable the DU(s) 231*c* and the CU 211*c* to be implemented in a server-based (e.g., cloud-based) RAN architecture, such as a vRAN architecture.

The SMO Framework 207*c* may be configured to support RAN deployment and provisioning of non-virtualized and virtualized network elements. For non-virtualized network elements, the SMO Framework 207*c* may be configured to support the deployment of dedicated physical resources for RAN coverage requirements which may be managed via an operations and maintenance interface (such as an O1 interface). For virtualized network elements, the SMO Framework 207*c* may be configured to interact with a cloud computing platform (such as an open cloud (O-Cloud) 291*c*) to perform network element life cycle management (such as to instantiate virtualized network elements) via a cloud computing platform interface (such as an O2 interface). Such virtualized network elements can include, but are not limited to, CUs 211*c*, DUs 231*c*, RUs 241*c* and Near-RT RICs 227*c*. In some implementations, the SMO Framework 207*c* can communicate with a hardware aspect of a 4G RAN, such as an open eNB (O-eNB) 213*c*, via an O1 interface. Additionally, in some implementations, the SMO Framework 207*c* can communicate directly with one or more RUs 241*c* via an O1 interface. The SMO Framework 207*c* also may include a Non-RT RIC 217*c* configured to support functionality of the SMO Framework 207*c*.

The Non-RT RIC 217*c* may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227*c*. The Non-RT RIC 217*c* may be coupled to or communicate with (such as via an A1 interface) the Near-RT RIC 227*c*. The Near-RT RIC 227*c* may be configured to include a logical function that enables near-real-time control and optimization of RAN elements and resources via data collection and actions over an interface (such as via an E2 interface) connecting one or more CUs 211*c*, one or more DUs 231*c*, or both, as well as an O-eNB 213*c*, with the Near-RT RIC 227*c*.

In some implementations, to generate AI/ML models to be deployed in the Near-RT RIC 227*c*, the Non-RT RIC 217*c* may receive parameters or external enrichment information from external servers. Such information may be utilized by the Near-RT RIC 227*c* and may be received at the SMO Framework 207*c* or the Non-RT RIC 217*c* from non-network data sources or from network functions. In some examples, the Non-RT RIC 217*c* or the Near-RT RIC 227*c* may be configured to tune RAN behavior or performance. For example, the Non-RT RIC 217*c* may monitor long-term trends and patterns for performance and employ AI/ML models to perform corrective actions through the SMO Framework 207*c* (such as reconfiguration via 01) or via creation of RAN management policies (such as A1 policies).

Figure 3:
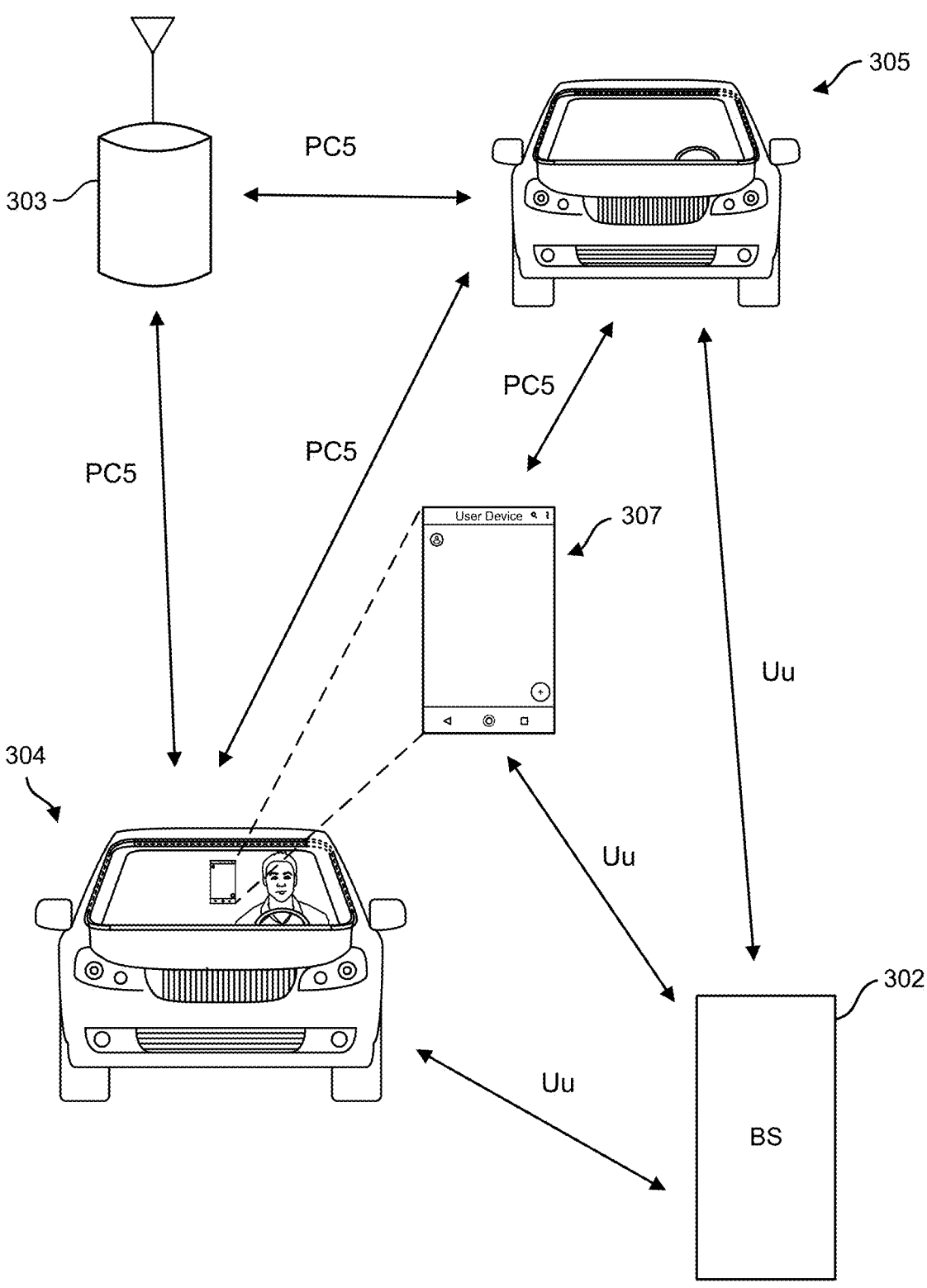
FIG. 3 is a diagram illustrating an example of various user equipment (UEs) communicating over direct communication interfaces (e.g., a cellular based PC5 sidelink interface, 802.11p defined DSRC interface, or other direct interface) and wide area network (Uu) interfaces, in accordance with some examples.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 (or UE) communicating with the base station 302 using a network (Uu) interface. As described below, functionalities can be transferred from a vehicle (e.g., vehicle 304) to a user device (e.g., user device 307) based on one or more characteristics or factors (e.g., temperature, humidity, etc.). In one illustrative example, V2X functionality can be transitioned from the vehicle 304 to the user device 307, after which the user device 307 can communicate with other vehicles (e.g., vehicle 305) over a PC5 interface (or other device to device direct interface, such as a DSRC interface), as shown in FIG. 3.

While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
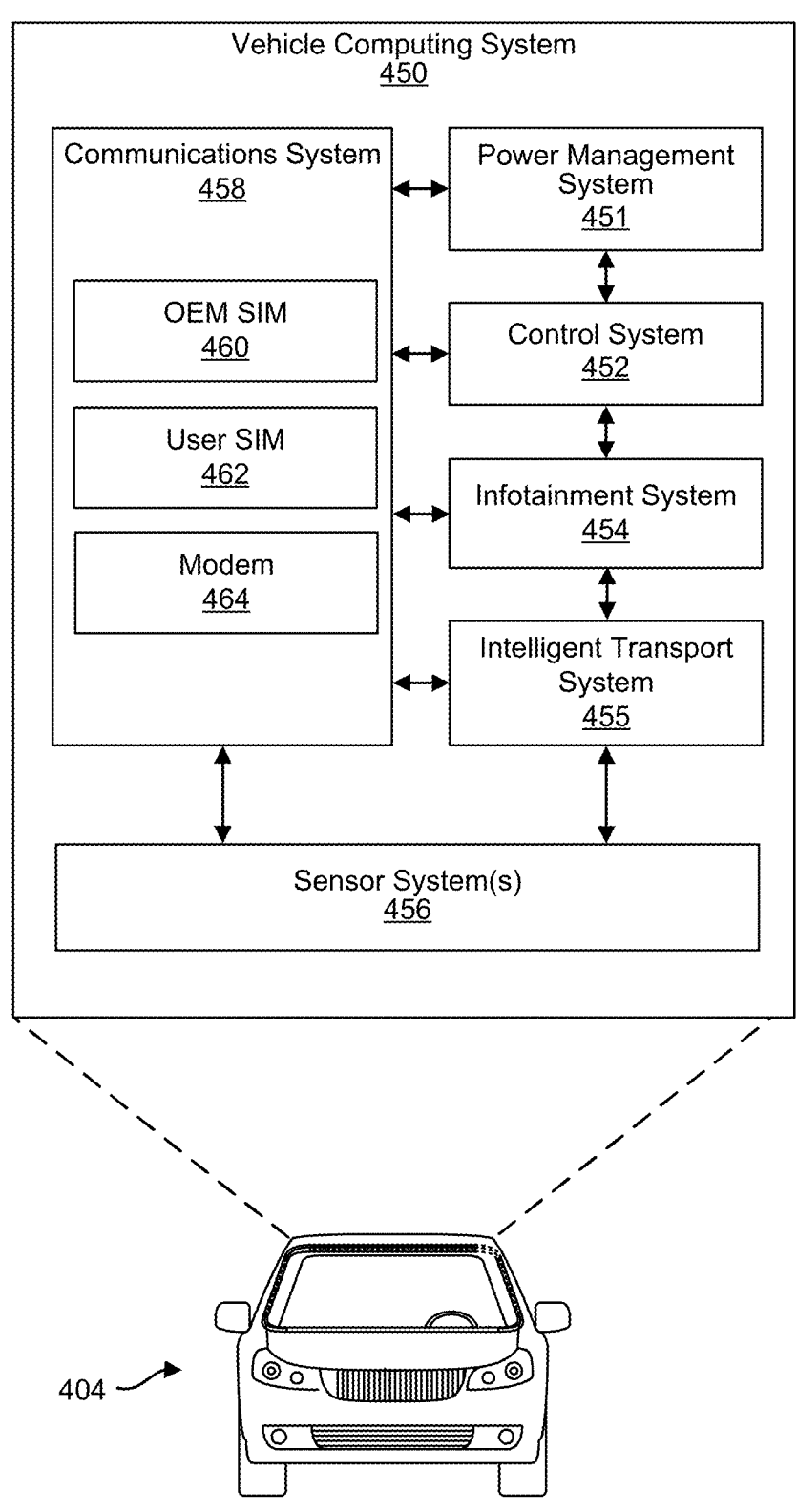
FIG. 4 is a block diagram illustrating an example of a computing system of a vehicle, in accordance with some examples.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFi™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 can include the intelligent transport system (ITS) 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404.

The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
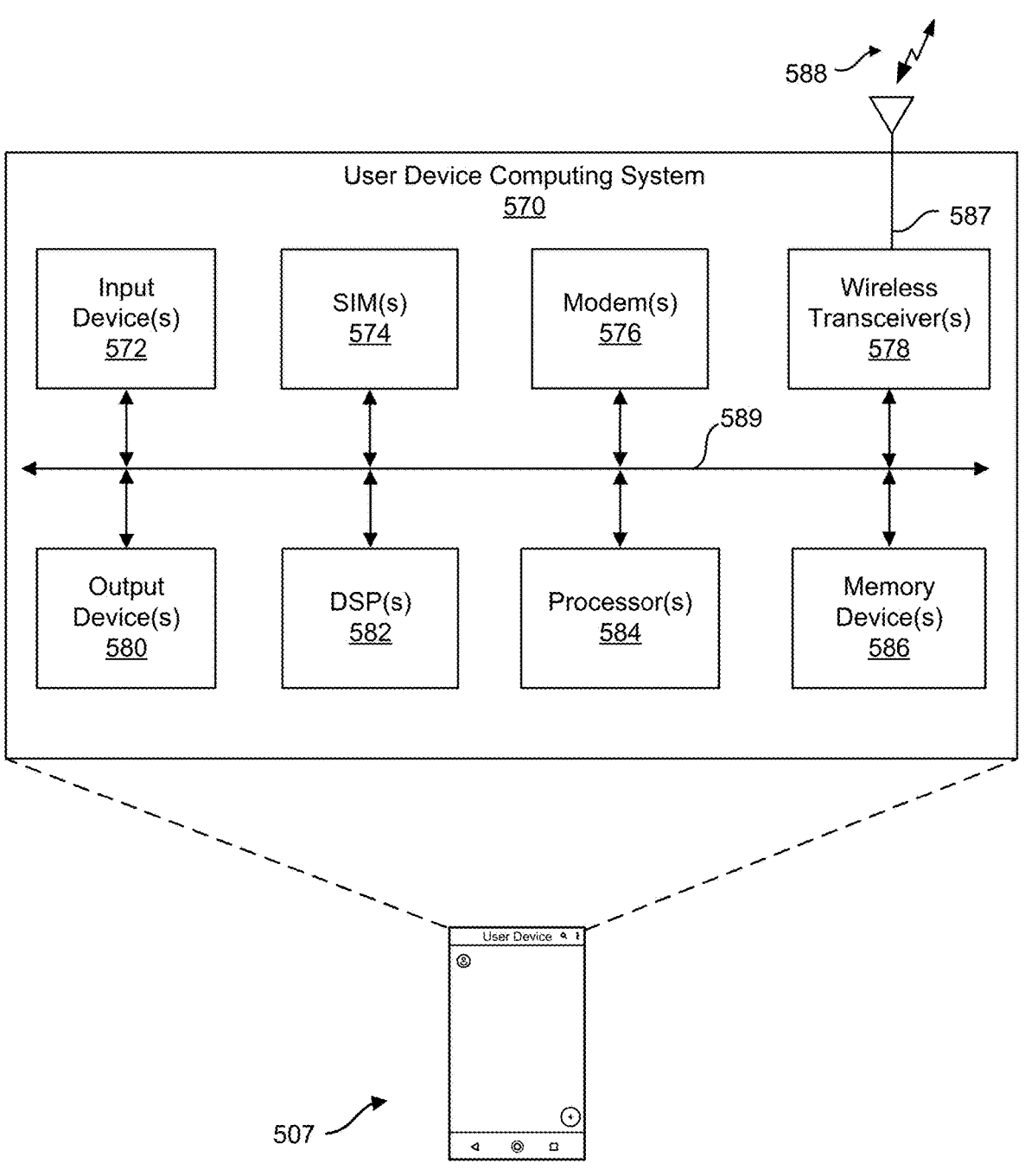
FIG. 5 is a block diagram illustrating an example of a computing system of a user device, in accordance with some examples.

FIG. 5 illustrates an example of a computing system 570 of a user device 507 (or UE). The user device 507 is an example of a UE that can be used by an end-user. For example, the user device 507 can include a mobile phone, router, tablet computer, laptop computer, tracking device, a network-connected wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICs, FPGAS, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFi routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 6A:
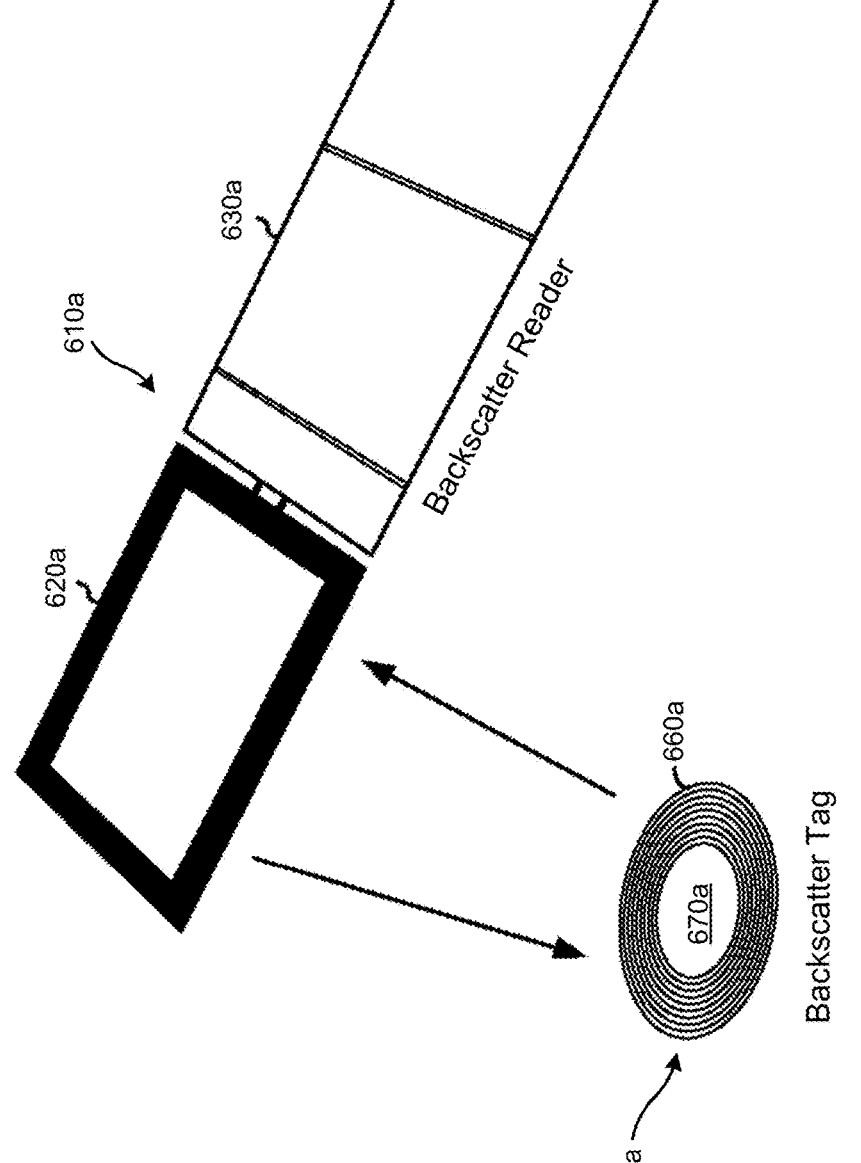
FIG. 6A is a diagram illustrating an example of a backscatter system, in accordance with some examples.

FIG. 6A is a diagram illustrating an example backscatter system 600a that includes a backscatter reader (e.g., energizer) 610a and a backscatter tag 650a. The backscatter reader 610a may also be referred to as an interrogator, a scanner, an energizer, etc. The backscatter tag 650a may also be referred to as a backscatter label (e.g., an RFID tag or label, a near-field communication (NFC) tag or label, an ambient IoT tag or label, etc.), an electronics label, etc.

Backscatter reader 610a includes an antenna 620a and an electronics unit 630a. Antenna 620a radiates signals transmitted by backscatter reader 610a and receives signals from backscatter tags (e.g., such as the backscatter tag 650a) and/or other devices. Electronics unit 630a may include a transmitter and a receiver for reading backscatter tags such as backscatter tag 650a. The same pair of transmitter and receiver (or another pair of transmitter and receiver) may support bi-directional communication with wireless networks, wireless devices, etc. In some examples, a first backscatter reader or backscatter device can include a transmitter for energizing one or more backscatter tags, and a second backscatter reader or backscatter device can include a receiver for receiving the reflected signals from the one or more backscatter tags. For instance, a backscatter reader can be configured to implement energizing and tag reading capabilities (e.g., includes a transmitter and a receiver), can be configured to implement energizing capabilities (e.g., includes a transmitter), and/or can be configured to implement tag reading capabilities (e.g., includes a receiver). The electronics unit 630a may include processing circuitry (e.g., a processor) to perform processing for data being transmitted and received by backscatter reader 610a.

Backscatter tag 650a includes an antenna 660a and a data storage element 670a. Antenna 660a radiates signals transmitted by backscatter tag 650a and receives signals from backscatter reader 610a and/or other devices. For instance, backscatter tags can be passive, active, or semi-active. Passive backscatter tags utilize the interrogating signal from a backscatter reader to power a transmission by or from the backscatter tag. Active and semi-active backscatter tags can include a power source or battery, which can be used to power a transmission by or from the backscatter tag. In some examples, the backscatter tag 650a may be a passive backscatter tag having no battery. In this case, a magnetic field from a signal transmitted by backscatter reader 610a (e.g., an energizing or interrogating signal from the backscatter reader 610a) may induce an electrical current in backscatter tag 650a, which may then operate based on the induced current. Backscatter tag 650a can radiate its signal in response to receiving a signal from backscatter reader 610a or some other device.

The backscatter tag 650a can use the data storage element 670a to store identification information corresponding to the backscatter tag 650a and/or corresponding to an item associated with the backscatter tag 650a (e.g., an item to which the backscatter tag 650a is attached, etc.). For example, data storage element 670a can be used to store identification information using various granularity levels for tracking and management of a backscatter tagged item. A backscatter tag attached to a respective item, or attached to a group of items, may store corresponding information thereof. For example, the backscatter tag 650a can be configured to store, using data storage element 670a, identification information corresponding to the item(s) to which the backscatter tag 650a is attached and associated. For instance, backscatter tag information can include one or more of a product name, a serial number, product information, a manufacturer, etc. In some examples, the backscatter tag 650a can store (e.g., using the data storage element 670a) identification information that is directly indicative of a tagged item, product, object, etc. For instance, the backscatter tag 650a can store identification information such as a unique product serial number, etc. In some examples, the backscatter tag 650a does not store product or item identification information directly, and stores a unique backscatter tag serial number or identification number corresponding to the backscatter tag 650a, which may be externally mapped to various item identification information such as product serial numbers, product names, product SKUs, etc. Data storage element 670a can be configured to store identification information for backscatter tag 650a, e.g., in an electrically erasable programmable read-only memory (EEPROM). Backscatter tag 650a may also include an electronics unit that can process the received signal and generate the signals to be transmitted.

Backscatter tag 650a may be read as follows. Backscatter reader 610a may be placed or moved within close proximity to backscatter tag 650a. Backscatter reader 610a may radiate a first signal (which is also called an interrogation signal) via its antenna 620a. The energy of the first signal may be coupled from backscatter reader antenna 620a to backscatter tag antenna 660a via magnetic coupling and/or other phenomena. Backscatter tag 650a may receive the first signal from backscatter reader 610a via antenna 660a and, in response, may radiate a second signal (which is also referred to as a responding signal) comprising the information stored in data storage element 670a. Backscatter reader 610a may receive the second signal from backscatter tag 650a via antenna 620a and may process the received signal to obtain the information sent in the second signal. Backscatter system 600a may be designed to operate at 63.56 MHz or some other frequency. Backscatter reader 610a may have a specified maximum transmit power level, which may be imposed by the Federal Communication Commission (FCC) in the United Stated or other regulatory bodies in other countries. The specified maximum transmit power level of backscatter reader 610a limits the distance at which backscatter tag 650a can be read by backscatter reader 610a.

Figure 6B:
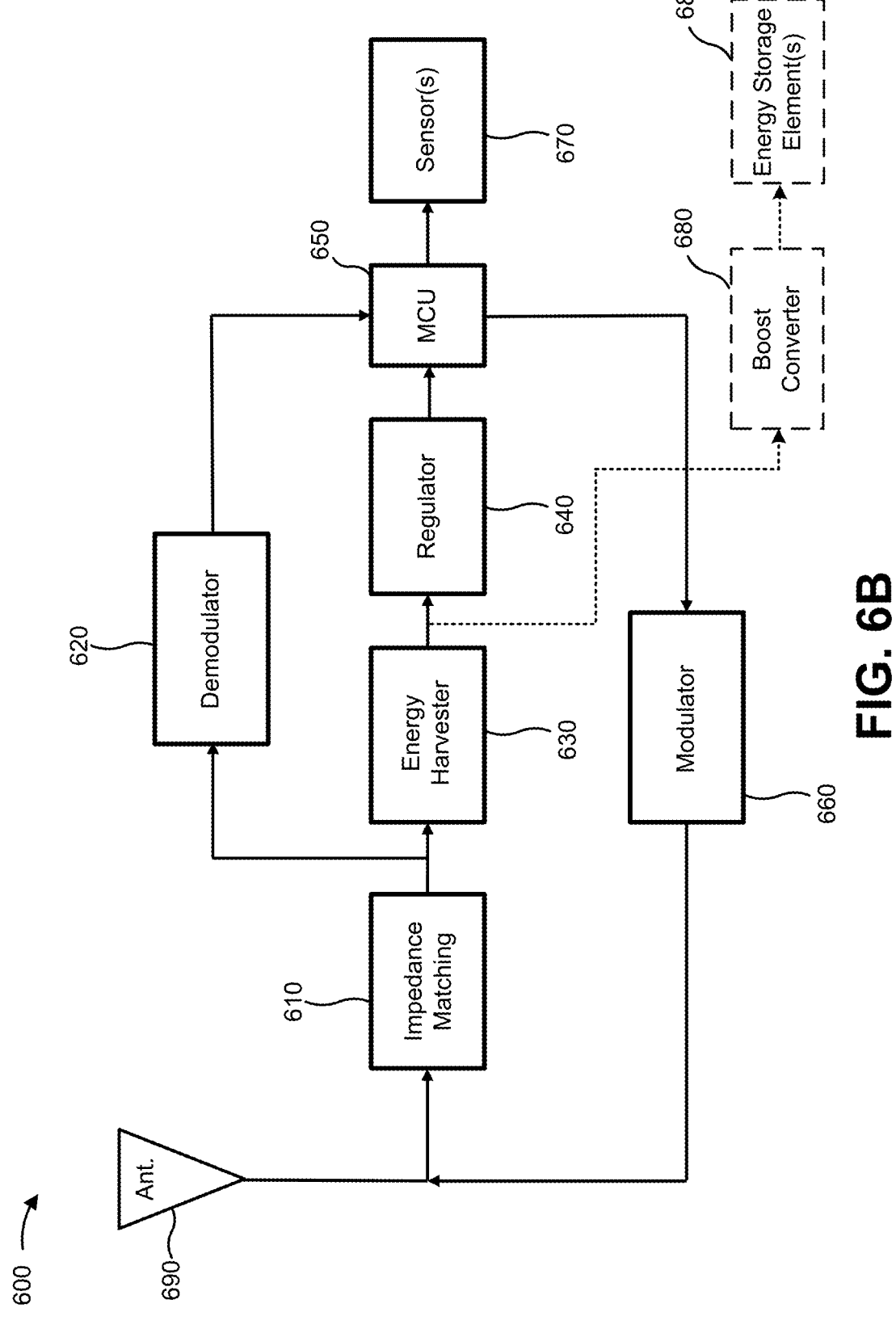
FIG. 6B is a diagram illustrating an example of a radio frequency (RF) energy harvesting device, in accordance with some examples.

FIG. 6B is a diagram illustrating an example of an architecture of a radio frequency (RF) energy harvesting device 600, in accordance with some examples. In one illustrative example, the RF energy harvesting device 600 can be an ambient IoT (AIoT) device (e.g., the energy harvesting device 600 may also be referred to as AIoT device 600). As will be described in greater depth below, the energy harvesting device 600 (e.g., AIoT device) can harvest RF energy from one or more RF signals received using an antenna 690. The one or more RF signals received using antenna 690 can be ambient RF signals. For instance, an ambient RF signal can be provided as a dedicated carrier wave (CW) for backscatter modulation by the AIoT device 600. An ambient RF signal can also be provided as an ambient NR signal (e.g., a non-dedicated carrier wave that may still be backscatter modulated by AIoT device 600). As used herein, the term "energy harvesting" may be used interchangeably with "power harvesting." In some aspects, AIoT device 600 can be implemented as an Internet-of-Things (IoT) device, can be implemented as a sensor, etc., as will be described in greater depth below. In other examples, AIoT device 600 can be implemented as a Radio-Frequency Identification (RFID) tag or various other RFID devices.

The AIoT device 600 includes one or more antennas 690 that can be used to transmit and receive one or more wireless signals. For example, AIoT device 600 can use antenna(s) 690 to receive one or more downlink signals and to transmit one or more uplink signals. An impedance matching component 610 can be used to match the impedance of antenna(s) 690 to the impedance of one or more (or all) of the receive components included in AIoT device 600. In some examples, the receive components of AIoT device 600 can include a demodulator 620 (e.g., for demodulating a received downlink signal), an energy harvester 630 (e.g., for harvesting RF energy from the received downlink signal), a regulator 640, a micro-controller unit (MCU) 650, and a modulator 660 (e.g., for generating an uplink signal). In some cases, the receive components of AIoT device 600 may further include one or more sensors 670.

The downlink signals can be received from one or more transmitters (e.g., RF sources). For example, AIoT device 600 may receive a downlink signal from a network node or network entity that is included in a same wireless network as the AIoT device 600. In some cases, the network entity can be a base station, gNB, etc., that communicates with the AIoT device 600 using a cellular communication network. For example, the cellular communication network can be implemented according to the 3G, 4G, 6G, and/or other cellular standard (e.g., including future standards such as 6G and beyond).

In some cases, AIoT device 600 can be implemented as a passive or semi-passive energy harvesting device (e.g., an AIoT device), which can perform passive uplink communication by modulating and reflecting a downlink signal received via antenna(s) 690. For example, passive and semi-passive energy harvesting devices may be unable to generate and transmit an uplink signal without first receiving a downlink signal that can be modulated and reflected. In other examples, AIoT device 600 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

An AIoT device (e.g., active or semi-passive energy harvesting device) may include one or more energy storage elements 685 (e.g., collectively referred to as an "energy reservoir"). For example, the one or more energy storage elements 685 can include batteries, capacitors, etc. In some examples, the one or more energy storage elements 685 may be associated with a boost converter 680. The boost converter 680 can receive as input at least a portion of the energy harvested by energy harvester 630 (e.g., with a remaining portion of the harvested energy being provided as instantaneous power for operating the AIoT device 600). In some aspects, the boost converter 680 may be a step-up converter that steps up voltage from its input to its output (e.g., and steps down current from its input to its output). In some examples, boost converter 680 can be used to step up the harvested energy generated by energy harvester 630 to a voltage level associated with charging the one or more energy storage elements 685. An AIoT device (e.g., active or semi-passive energy harvesting device) may include one or more energy storage elements 685 and may include one or more boost converters 680. A quantity of energy storage elements 685 may be the same as or different than a quantity of boost converters 680 included in an active or semi-passive energy harvesting device.

A passive energy harvesting device does not include an energy storage element 685 or other on-device power source. For example, a passive energy harvesting device may be powered using only RF energy harvested from a downlink signal (e.g., using energy harvester 630). As mentioned previously, a semi-passive energy harvesting device can include one or more energy storage elements 685 and/or other on-device power sources. The energy storage element 685 of a semi-passive energy harvesting device can be used to augment or supplement the RF energy harvested from a downlink signal. In some cases, the energy storage element 685 of a semi-passive energy harvesting device may store insufficient energy to transmit an uplink communication without first receiving a downlink communication (e.g., minimum transmit power of the semi-passive device>capacity of the energy storage element). An active energy harvesting device can include one or more energy storage elements 685 and/or other on-device power sources that can power uplink communication without using supplemental harvested RF energy (e.g., minimum transmit power of the active device<capacity of the energy storage element). The energy storage element(s) 685 included in an active energy harvesting device and/or a semi-passive energy harvesting device can be charged using harvested RF energy.

As mentioned above, AIoT devices (e.g., passive and semi-passive energy harvesting devices) transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlink signal can be used to perform energy harvesting. A portion of the downlink signal is used as a signal resource for backscattering and a remaining portion of the downlink signal can be used as an energy resource for energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, AIoT devices (e.g., passive and semi-passive energy harvesting devices) may be unable to transmit an uplink signal (e.g., passive communication). Active energy harvesting devices do not depend on receiving a downlink signal in order to transmit an uplink signal and can transmit an uplink signal as desired (e.g., active communication).

In examples in which the energy harvesting device 600 is implemented as an AIoT device (e.g., a passive or semi-passive energy harvesting device), a continuous carrier wave downlink signal may be received using antenna(s) 690 and modulated (e.g., re-modulated) for uplink communication. In some cases, a modulator 660 can be used to modulate the reflected (e.g., backscattered) portion of the downlink signal. For example, the continuous carrier wave may be a continuous sinusoidal wave (e.g., sine or cosine waveform) and modulator 660 can perform modulation based on varying one or more of the amplitude and the phase of the backscattered reflection. Based on modulating the backscattered reflection, modulator 660 can encode digital symbols (e.g., such as binary symbols or more complex systems of symbols) indicative of an uplink communication or data message. For example, the uplink communication may be indicative of sensor data or other information associated with the one or more sensors 670 included in AIoT device 600.

As mentioned previously, impedance matching component 610 can be used to match the impedance of antenna(s) 690 to the receive components of AIoT device 600 when receiving the downlink signal (e.g., when receiving the continuous carrier wave). In some examples, during backscatter operation (e.g., when transmitting an uplink signal), modulation can be performed based on intentionally mismatching the antenna input impedance to cause a portion of the incident downlink signal to be scattered back. The phase and amplitude of the backscattered reflection may be determined based on the impedance loading on the antenna(s) 690. Based on varying the antenna impedance (e.g., varying the impedance mismatch between antenna(s) 690 and the remaining components of AIoT device 600), digital symbols and/or binary information can be encoded (e.g., modulated) onto the backscattered reflection. Varying the antenna impedance to modulate the phase and/or amplitude of the backscattered reflection can be performed using modulator 660.

As illustrated in FIG. 6B, a portion of a downlink signal received using antenna(s) 690 can be provided to a demodulator 620, which performs demodulation and provides a downlink communication (e.g., carried or modulated on the downlink signal) to a micro-controller unit (MCU) 650 or other processor included in the AIoT device 600. A remaining portion of the downlink signal received using antenna(s) 690 can be provided to energy harvester 630, which harvests RF energy from the downlink signal. For example, energy harvester 630 can harvest RF energy based on performing AC-to-DC (alternating current-to-direct current) conversion, wherein an AC current is generated from the sinusoidal carrier wave of the downlink signal and the converted DC current is used to power the energy harvesting device 600. In some aspects, energy harvester 630 can include one or more rectifiers for performing AC-to-DC conversion. A rectifier can include one or more diodes or thin-film transistors (TFTs). In one illustrative example, energy harvester 630 can include one or more Schottky diode-based rectifiers. In some cases, energy harvester 630 can include one or more TFT-based rectifiers.

The output of the energy harvester 630 is a DC current generated from (e.g., harvested from) the portion of the downlink signal provided to the energy harvester 630. In some aspects, the DC current output of energy harvester 630 may vary with the input provided to the energy harvester 630. For example, an increase in the input current to energy harvester 630 can be associated with an increase in the output DC current generated by energy harvester 630. In some cases, MCU 650 may be associated with a narrow band of acceptable DC current values. Regulator 640 can be used to remove or otherwise decrease variation(s) in the DC current generated as output by energy harvester 630. For example, regulator 640 can remove or smooth spikes (e.g., increases) in the DC current output by energy harvester 630 (e.g., such that the DC current provided as input to MCU 650 by regulator 640 remains below a first threshold). In some cases, regulator 640 can remove or otherwise compensate for drops or decreases in the DC current output by energy harvester 630 (e.g., such that the DC current provided as input to MCU 650 by regulator 640 remains above a second threshold).

In some aspects, the harvested DC current (e.g., generated by energy harvester 630 and regulated upward or downward as needed by regulator 630) can be used to power MCU 650 and one or more additional components included in the AIoT device 600. For example, the harvested DC current can additionally be used to power one or more (or all) of the impedance matching 610, demodulator 620, regulator 640, MCU 650, sensors 670, modulator 660, etc. For example, sensors 670 and modulator 660 can receive at least a portion of the harvested DC current that remains after MCU 650 (e.g., that is not consumed by MCU 650). In some cases, the harvested DC current output by regulator 640 can be provided to MCU 650, modulator 660, and sensors 670 in series, in parallel, or a combination thereof.

In some examples, sensors 670 can be used to obtain sensor data (e.g., such as sensor data associated with an environment in which the AIoT device 600 is located). Sensors 670 can include one or more sensors, which may be of a same or different type(s). In some aspects, one or more (or all) of the sensors 670 can be configured to obtain sensor data based on control information included in a downlink signal received using antenna(s) 690. For example, one or more of the sensors 670 can be configured based on a downlink communication obtained based on demodulating a received downlink signal using demodulator 620. In one illustrative example, sensor data can be transmitted based on using modulator 660 to modulate (e.g., vary one or more of amplitude and/or phase of) a backscatter reflection of the continuous carrier wave received at antenna(s) 690. Based on modulating the backscattered reflection, modulator 660 can encode digital symbols (e.g., such as binary symbols or more complex systems of symbols) indicative of an uplink communication or data message. In some examples, modulator 660 can generate an uplink, backscatter modulated signal based on receiving sensor data directly from sensors 670. In some examples, modulator 660 can generate an uplink, backscatter modulated signal based on received sensor data from MCU 650 (e.g., based on MCU 650 receiving sensor data directly from sensors 670).

Figure 7:
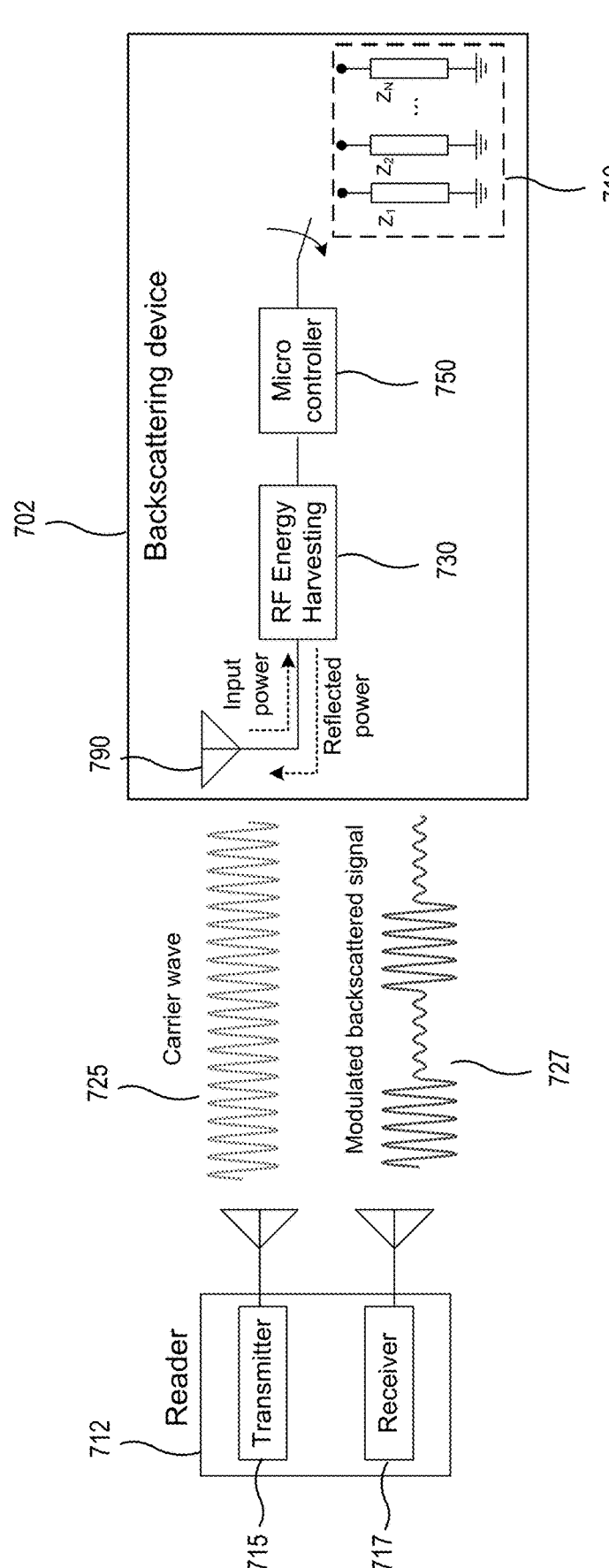
FIG. 7 is a diagram illustrating an example of backscatter communications performed by an RF backscatter device such as an ambient Internet-of-Things (ambient IoT) device and/or a passive UE, in accordance with some examples.

FIG. 7 is a diagram illustrating an example of backscatter communications 700 performed by an RF backscatter device 702. In one illustrative example, the RF backscatter device 702 can be an ambient IoT (AIoT) device, and may also be referred to as "AIoT device 702." For instance, an AIoT device can be a type of RF backscatter device. In the example backscatter communications 700, information transmission by AIoT device 702 is performed based on antenna modulation without active RF generation (e.g., at or by AIoT device 702). For instance, the backscatter communications 700 can be performed between AIoT device 702 and a reader device 712. The reader device 712 can be a network entity associated with and/or nearby to the AIoT device 702. For example, reader device 712 can be a base station, gNB, UE, etc. Reader device 712 can also be referred to as an "RF source" for the backscatter communications 700. For instance, reader device 712 may include a transmitter 715 that is configured to generate a carrier wave (CW) signal 725 that is utilized by AIoT device 702 to perform backscatter communications 702 (e.g., AIoT device 702 can generate a modulated backscattered signal 727 based on or using the incident CW signal 725 from transmitter 715 of reader device 712). In some aspects, AIoT device 702 of FIG. 7 can be the same as or similar to the AIoT device 600 of FIG. 6B. For instance, AIoT device 702 can include an antenna 790 that may be the same as or similar to the antenna 690 of FIG. 6B. AIoT device 702 can additionally include an energy harvester 730 that may be the same as or similar to the energy harvester 630 of FIG. 6B; may include a micro-controller 750 that may be the same as or similar to the MCU 650 of FIG. 6B; may include an impedance matching engine 710 that may be the same as or similar to the impedance matching 610 of FIG. 6B; etc.

As noted above, AIoT device 702 can perform backscatter communications 700, where information transmission (e.g., by or from AIoT device 702) is performed based on antenna modulation without active RF generation. For instance, the AIoT device 702 can modulate an incoming RF signal (e.g., CW signal 725) by intentionally switching the load impedance at impedance matching engine 710. The switching of load impedance at impedance matching engine 710 can be configured to vary the amplitude and/or phase of its backscattered signal (e.g., the modulated backscattered signal 727 is modulated based on the varying amplitude and/or phase caused by the switching of load impedance at impedance matching engine 710). In one illustrative example, AIoT device 702 may implement BPSK modulation (e.g., modulated backscattered signal 727 can be a BPSK modulated signal). The AIoT device 702 can switch the value of the load impedance at impedance matching engine 710 between a relatively high impedance value and a (lower) relatively matched load. In the high impedance switching case, the impedance mismatch between the antenna 790 and the load impedance at impedance matching engine 710 can cause most or all of the incoming RF power (e.g., "input power" at antenna 790, from CW signal 725 to be reflected back to the reader device 712 (e.g., reflected back to the receiver 717 of reader device 712). For instance, when impedance matching engine 710 switches the load impedance to be greater than the antenna 790 impedance, the "input power"="reflected power" at antenna 790.

In the low impedance switching case, the impedance is approximately matched between antenna 790 and the load impedance at impedance matching engine 710. Based on the approximately matched impedance, most or all of the incoming RF power (e.g., "input power" at antenna 790, from CW signal 725) is absorbed, and very little power is reflected back to the reader device 712 (e.g., reflected back to receiver 717 of reader device 712). For instance, when impedance matching engine 710 switches the load impedance to match the antenna 790 impedance, the "input power">>"reflected power" at antenna 790. In some aspects, the impedance switching frequency implemented by impedance matching engine 710 can be based on the data rate of the data being modulated onto the modulated backscattered signal 727 by AIoT device 702.

As noted previously, the systems and techniques described herein can be used to provide vehicle display messages and/or alert information for output on one or more displays included in a vehicle, wherein the displayed messages or alerts correspond to information determined based on communication(s) from one or more ambient IoT devices or backscatter tags. In one illustrative example, an adaptive vehicle display can be configured with a display message or alert information that is determined based on signaling and/or interactions between an interrogating device or transceiver associated with the vehicle and/or the display, and an ambient IoT tag (e.g., among various other backscatter tags, such as RFID tags, NFC tags, etc.) associated with a driver of the vehicle, a passenger of the vehicle, etc. For instance, the signaling and/or interactions between the interrogating device and the ambient IoT tag can be used to detect a student driver occupying the driver's seat of the vehicle, and the display can be configured with a display message indicative of the student driver status. An example of adaptive display messages based on determining driver status information of a driver of the vehicle is described with respect to FIG. 8. In another illustrative example, the signaling and/or interactions between the interrogating device (e.g., the vehicle) and an additional (e.g., nearby) vehicle can be used to generate adaptive display messages or warnings based on inter-vehicle measurements and/or V2X and/or NR-SL messages between the vehicle and one or more vehicles in the vicinity (e.g., the additional or nearby vehicle, etc.). An example of adaptive display messages based on inter-vehicle measurements and/or V2X communications is described with respect to FIG. 9. In another illustrative example, the systems and techniques can be used to generate adaptive display messages or warnings to the driver and/or occupants of the vehicle that includes the display. For instance, one or more driver or occupant monitoring systems can be included in the vehicle and used to monitor the health, awareness, focus, biometrics, etc., of the driver, occupants or passengers, animals, etc., located within the vehicle. An inward-facing vehicle display and/or an outward-facing vehicle display included in the vehicle can be configured with adaptive display messages indicative of the current occupant status, warning, or alert information. An example of adaptive display messages based on occupant status information determined by onboard monitoring systems of the vehicle is described with respect to FIG. 10.

Figure 8:
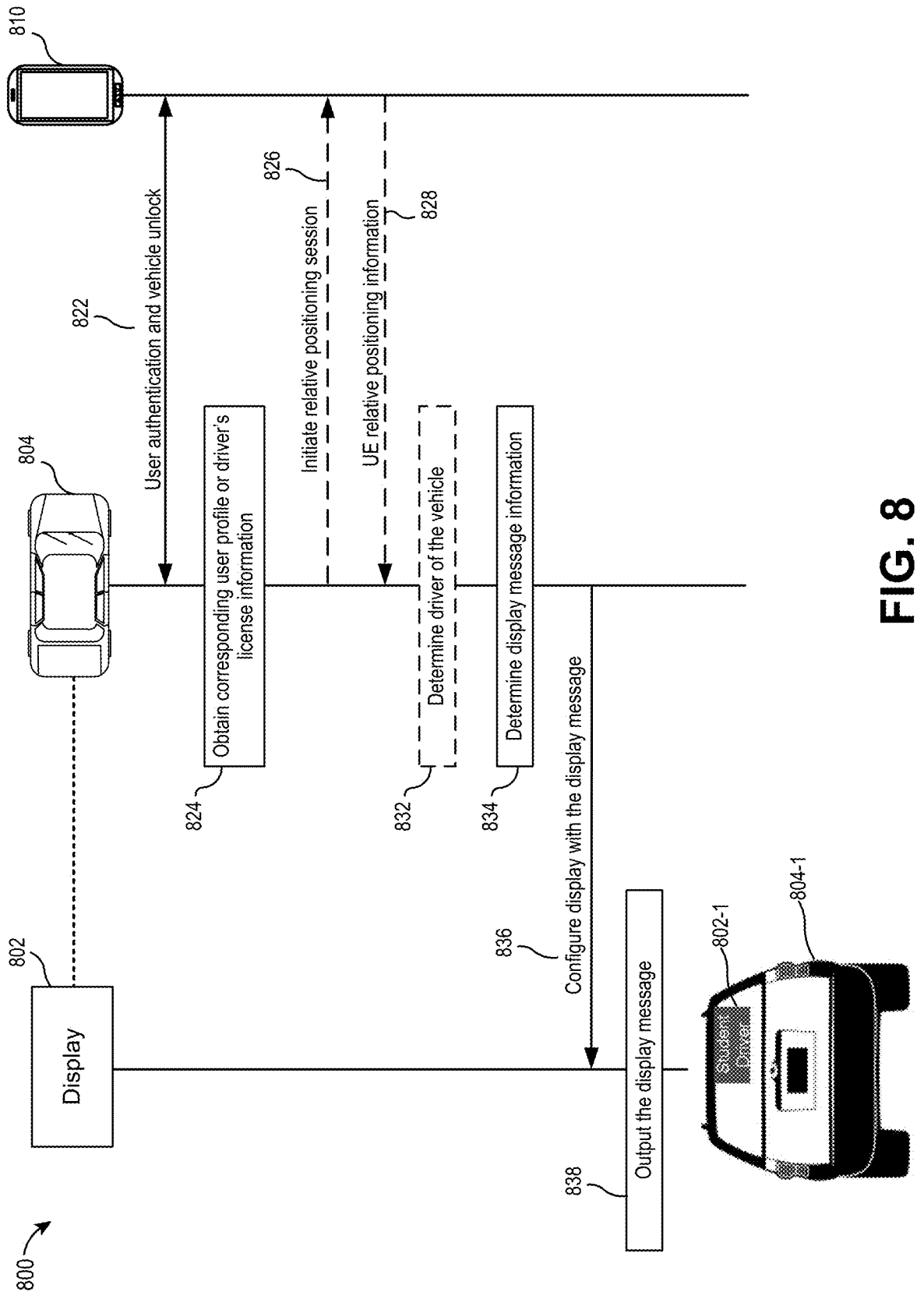
FIG. 8 is a signaling diagram corresponding to a process of wireless communication between a vehicle, a user equipment (UE), and a display associated with the vehicle, in accordance with some examples.

As noted previously, in one illustrative example, the systems and techniques described herein can be used to provide adaptive vehicle display messages based on adaptive driver status information of a driver and/or other occupant of the vehicle. For instance, FIG. 8 is a signaling diagram corresponding to a process of wireless communication 800 between a vehicle 804, a user equipment (UE) 810, and a display 802 associated with the vehicle 804, in accordance with some examples.

The vehicle 804 can be the same as or similar to one or more of the vehicle 305 and/or the vehicle 304 of FIG. 3, the vehicle 404 of FIG. 4, etc. In some cases, the vehicle 804 can be a V2X-capable vehicle that is configured to transmit and/or receive one or more V2X messages and/or NR-SL messages from nearby vehicles. In some aspects, the vehicle 804 can be any vehicle that is configured to communicate with the UE 810 and the display 802.

The display 802 can be included in, attached to, and/or associated with the vehicle 804. In some cases, the display 802 can be integrated with one or more portions or components of the vehicle 804. In some examples, the display 802 can be attached or mounted to one or more portions or components of the vehicle 804. In one illustrative example, the display 802 can be an outward-facing display for presenting (e.g., displaying or outputting) one or more messages visible from outside of the vehicle 804. In some cases, the display 802 can be located inside of or within the enclosed volume (e.g., passenger or cargo compartment, etc.) of the vehicle 804. In some examples, the display 802 can be located outside of or external to the enclosed volume of the vehicle 804. In some cases, the display 802 can be a low-power display and/or a static or semi-static display. For instance, the display 802 can be an electronic ink (e.g., e-ink) display. In one illustrative example, the display 802 can be a rear-facing display associated with the vehicle 804. For instance, the display 802 can be visible through a rear window of the vehicle 804, etc. In some examples, the display 802 can be included in and/or associated with a vehicle computing system of the vehicle 804 (e.g., which may be the same as or similar to the vehicle computing system 450 of the vehicle 404 of FIG. 4). In some aspects, the display 802 can be included in and/or associated with a vehicle communications system of the vehicle 804, which may be the same as or similar to the vehicle communications system 458 of FIG. 4. In another example, the display 802 can be included in and/or associated with an infotainment system of the vehicle 804, which may be the same as or similar to the vehicle infotainment system 454 of FIG. 4.

In some aspects, the display 802 can be associated with (e.g., communicates with) one or more of an ambient IoT device (e.g., ambient IoT tag), a backscatter device (e.g., backscatter tag), a radio or RF transceiver, etc. The ambient IoT device, backscatter device, radio, and/or RF transceiver may be included in the display 802 and/or may be external to and associated with the display. In some examples, the display 802 can be coupled or connected (e.g., wired, wirelessly, or combinations thereof) to one or more ambient IoT devices or tags, one or more backscatter devices or tags, one or more radios, one or more RF transceivers, etc., included in the vehicle 804. In one illustrative example, the display 802 can be connected (e.g., wired, wirelessly, or both) to an ambient IoT or backscatter tag that is provided on or near the driver's seat location within the vehicle 804. In some cases, one or more of an ambient IoT or backscatter tag, a radio, and/or an RF transceiver can be provided on or near multiple occupant locations within the vehicle 804 (e.g., at a first location corresponding to the driver's seat within vehicle 804, at a second location corresponding to a front seat passenger within the vehicle 804, at one or more third locations corresponding to respective rear passengers within the vehicle 804, etc.).

In one illustrative example, the UE 810 can be a UE that is associated with an occupant of the vehicle 804. For instance, the UE 810 can be a smartphone or other UE that is worn and/or carried by an occupant of the vehicle 804 (e.g., the respective user of the smartphone or other UE). For example, UE 810 can be a smartphone or other UE that is worn and/or carried by a driver of the vehicle 804, a passenger or non-driver occupant of the vehicle 804 (e.g., front-seat passenger, rear-seat passenger, etc.). In some aspects, the UE 810 may be associated with a driver of the vehicle 804, and may also be referred to as the "driver UE 810." In some aspects, the UE 810 may be associated with a passenger or non-driver occupant of the vehicle 804, and may also be referred to as the "passenger UE 810." As used herein, reference to "the UE 810" or "UE 810" may refer to either the example of a driver UE or a passenger UE.

In one illustrative example, a user authentication and vehicle unlock process 822 can be performed between the vehicle 804 and the UE 810. The user authentication and vehicle unlock process 822 can be performed between the vehicle 804 and a driver UE 810 that is associated with and/or carried by the user who will be driving vehicle 804. The user authentication and vehicle unlock process 822 may also be performed between the vehicle 804 and a passenger UE 810 that is associated with and/or carried by a non-driver occupant (e.g., passenger) of the vehicle 804.

In some cases, the UE 810 can be configured as a digital vehicle key for authenticating the user (e.g., the driver) to access, enter, use, and/or drive, etc., the vehicle 804. For instance, the UE 810 can implement a digital vehicle key based on wireless communications exchanged between the UE 810 and a corresponding receiver or transceiver associated with the vehicle 804. For example, the UE 810 can implement a digital vehicle key based on Bluetooth Low Energy (BLE) or Near Field Communication (NFC) wireless communications, among various other wireless communications and wireless communications protocols. When configured as a digital vehicle key, cryptographic key exchanges can be performed between the UE 810 and the vehicle 804. For instance, cryptographic key exchanges can be performed between the UE 810 and an onboard control system of the vehicle 804, which may be the same as or similar to the control system 452 of the vehicle 404 of FIG. 4.

In some aspects, the cryptographic key exchange(s) between the UE 810 (e.g., UE configured as a digital vehicle key) and the vehicle 804 can be included in and/or used to implement a secure handshake, the successful performance of which can enable the UE 810 to lock or unlock the vehicle 804, start or stop the engine of the vehicle 804, etc. In some cases, the digital vehicle key (e.g., the UE 810) can perform the cryptographic key exchange based on cryptographic keys or cryptographic key information stored on a secure element within the UE 810. When the user associated with UE 810 initiates a vehicle control action (e.g., lock, unlock, start or stop engine, etc.) that requires authentication and/or authorization, the UE 810 can access the stored cryptographic keys within its secure element and may generate and transmit a secure signal (e.g., often encrypted and time-bound) to the control unit of the vehicle 804 for validation thereof. In some aspects, a digital vehicle key system implemented by and/or associated with the UE 810 can utilize geofencing features based on a determined location of the UE 810 and/or a determined relative location or position of the UE 810 relative to the vehicle 804, etc. In some aspects, a digital vehicle key system implemented by and/or associated with the UE 810 can utilize stored or configured driver profiles indicative of driver status information, driver limitations, driver rules, etc., that are imposed by the vehicle 804 when respective individuals are detected or identified as the current driver of the vehicle 804, etc.

In some cases, the user authentication and vehicle unlock process 822 can be initiated based on the proximity between the UE 810 and the vehicle 804 being less than or equal to a configured threshold. In some examples, the user unlock and vehicle unlock process 822 can be initiated based on a user control action or user control request provided as input to the UE 810 and transmitted from the UE 810 to the vehicle 804. The user authentication and vehicle unlock process 822 can include one or more steps. For example, the user authentication and vehicle unlock process 822 may first be performed to authenticate the identity of the user of UE 810. In some examples, authentication of the user of UE 810 can be performed based on a password or biometric signature that is unique to the driver and that is provided as input to the UE 810 by the particular user. The password, biometric signature, or other unique user input can be transmitted from UE 810 to the vehicle 804 (e.g., an onboard control system of the vehicle 804) to determine whether the user of UE 810 is authenticated or not authenticated.

In one illustrative example, the user authentication and vehicle unlock process 822 can include determining a unique identity and/or identifier corresponding to the user of the UE 810 (e.g., where the user of UE 810 will be the driver of vehicle 804, or a passenger within vehicle 804). The unique identity or identifier determined for the user of UE 810 can be used to obtain corresponding user profile or driver's license information of the particular user at block 824. In some examples, the corresponding user profile or driver's license information for the unique identity of the user of UE 810 can be obtained from a storage or database that is associated with the vehicle 804 and/or an onboard vehicle control or user authentication system included in the vehicle 804. For instance, the corresponding user profile or driver's license information can be obtained from configured user profile information associated with the digital vehicle key system implemented by or associated with the UE 810 and vehicle 804. In some aspects, the configured user profile and/or driver's license information for one or more registered (e.g., configured) users of the vehicle 804 and/or the digital vehicle key system can be stored onboard the vehicle 804. In other examples, the configured user profile and/or driver's license information can be stored remote from the vehicle 804.

In one illustrative example, at block 824, the vehicle 804 can map the authenticated unique identity or identifier of the user of UE 810 to the corresponding stored (e.g., pre-configured) user profile information, driver's license information, driver status information, etc., that was previously registered and stored for the user. For instance, the vehicle 804 can map the authenticated unique identity or identifier of the user of UE 810 (e.g., biometric signature, etc.) to the driver's license information for the particular user.

Based on the driver's license information or driver status information determined (e.g., obtained) for the unique identity of the user of UE 810, the vehicle 804 can determine corresponding display message information 834 that is indicative of at least a portion of the driver's license information or driver status information of the user of UE 810. For instance, based on determining that the user of UE 810 corresponds to stored or configured learner's permit or student driver driver's license information (e.g., at block 824), the vehicle 804 can, at block 834, determine display message information indicating that the current driver of vehicle 804 is a student driver. In another illustrative example, based on determining that the user of UE 810 corresponds to stored or configured driver's license information and/or user profile information of a handicapped driver, the vehicle 804 can, at block 834, determine display message information indicative of the handicap driver status of the current driver of vehicle 804.

At block 836, the vehicle 804 can configured the display 802 with the determined display message information from block 834. For instance, the vehicle 804 can communicate with the display 802 information indicative of the display message contents (e.g., the text of the display message for output or presentation on display 802, such as "STUDENT DRIVER," "LEARNER'S PERMIT," "HANDICAP DRIVER," etc. The vehicle 804 may additionally transmit display configuration information 836 indicative of one or more display output parameters, such as font, font size, font or line or character spacing, color, onset duration, expiration time, periodicity or repetition factor, etc.

At block 838, the onboard vehicle display 802 can output the display message 838 corresponding to the display message configuration information 836 received from the vehicle 804. For instance, the display 802 can be updated, refreshed, and/or configured to render for output presentation the text of the display message utilizing any display output parameters that were also specified by the vehicle 804 in the display configuration information 836. For instance, the example vehicle 804-1 (e.g., which can be the same as the vehicle 804 of the signaling diagram 800 of FIG. 8) can include an onboard vehicle display 802-1 (e.g., which can be the same as or similar to the display 802 of the signaling diagram 800 of FIG. 8) that is configured to output the display message at block 838 (e.g., outputting a display message "STUDENT DRIVER" based on the vehicle 804 determining that the corresponding driver's license infor-mation or driver status information for the user of UE 810 is a learner's permit, etc.).

In some aspects, the process 800 can include initiating a relative positioning session between the UE 810 and the vehicle 804. In some examples, the relative positioning session can be performed between the UE 810 and a configured location within the vehicle 804 (e.g., the location of a radio or RF transceiver within the vehicle 804 that is used for communicating with the UE 810 and/or is used to perform the relative positioning session, etc.).

For example, at block 826 the process 800 can addition-ally include initiating a relative positioning session based on signaling from the vehicle 804 to the UE 810. In some cases, the relative positioning session 826 can be initiated in response to one or more of the user authentication and vehicle unlock process 822 and/or obtaining the user profile information 824, etc. In some cases, based on the relative positioning session 826 initiated between the vehicle 804 and the UE 810, at block 828 the UE 810 may transmit to the vehicle 804 a corresponding UE relative positioning information. Based on the UE relative positioning informa-tion (e.g., a relative positioning signal transmitted from the UE 810 to the vehicle 804, etc.), the vehicle 804 may determine the relative position of the UE 810 within or near the vehicle 804.

In one illustrative example, the relative positioning ses-sion 826 and the UE relative positioning information 828 can be used to determine whether or not the UE 810 corresponds to or is associated with a driver of the vehicle 804 (e.g., if the UE 810 is a driver UE or is a passenger UE). For example, at block 832, the vehicle 804 can analyze one or more UE relative positioning signals 828 that are received from the UE 810 based on the initiated relative positioning session 826. The relative positioning session between the vehicle 804 and the UE 810 can be implemented based on various wireless communications and/or positioning signal-ing, such as UWB, Bluetooth, BLE, WiFi, NR-Sidelink, etc.

In some examples, to determine the driver of the vehicle at block 832, the vehicle 804 may be configured to use the relative positioning information 828 to track the trajectory of the UE 810 for a period of time following the user authen-tication and vehicle unlock 822 and the initiation of the relative positioning session 826. Based on determining that the trajectory of the UE 810 corresponds to the driver's seat position or location within the vehicle 804, the correspond-ing user profile or driver's license information obtained for the user of the UE 810 at block 824 can be identified as the user profile or driver's license information of the current driver of the vehicle 804 (e.g., at block 832, where the vehicle 804 is configured to determine the current driver). Based on determining that the trajectory of the UE 810 does not correspond to the driver's seat position and/or corre-sponds to a non-driver or passenger seat position within the vehicle 804, the corresponding user profile or driver's license information obtained for the user of the UE 81—at block 824 can be identified as belonging to a passenger or non-driver of the vehicle 804. For instance, the UE 810 that is used to unlock the vehicle 804 (e.g., used as a digital vehicle key at block 822) may be a UE carried by the owner of the vehicle 804, who sits in the front passenger seat while his or her child is practicing and learning to drive from the driver's seat of the vehicle 804. Based on the relative positioning session 826 and UE relative positioning infor-mation 828, the process 800 can determine, at block 832, whether the UE 810 corresponds to the driver of the vehicle 804, before using the corresponding user profile or driver's license information 824 of the user of the UE 810 to generate the display message information at block 834. In some aspects, the driver determination of block 832 may be based on one or more additional verification steps, such as the use of facial recognition and/or biometric sensors provided directly on the steering wheel of the vehicle 804 for further authentication of the current driver (e.g., further authenti-cation that the user of UE 810 or user corresponding to the profile/driver's license information 824 is the current driver of the vehicle 804).

In some cases, after successful user authentication and vehicle unlock is performed at block 822, the UE 810 can be used to energize an ambient IoT or other backscatter tag (e.g., RFID tag, NFC tag, etc.) associated with the vehicle display 802. In some aspects, the UE 810 can be configured to transmit an energizing signal that can be received by the ambient IoT tag or device associated with the display 802. In some cases, the ambient IoT tag or device energized by the UE 810 may be associated with and/or included in the display 802, the vehicle 804, or both. In some examples, the UE 810 can use beamforming to transmit the energizing signal(s) to the ambient IoT tag(s) or device(s) associated with the display 802 and/or the vehicle 804. In another example, an RF transmitter associated with or included within the vehicle 804 can be used to energize an ambient IoT tag or device associated with the display 802. In some cases, the display 802 can be configured to perform energy-harvesting from the energizing signal transmitted by the UE 810 and/or RF transmitter of vehicle 804. The display 802 may perform energy harvesting over extended periods of time.

Figure 9:
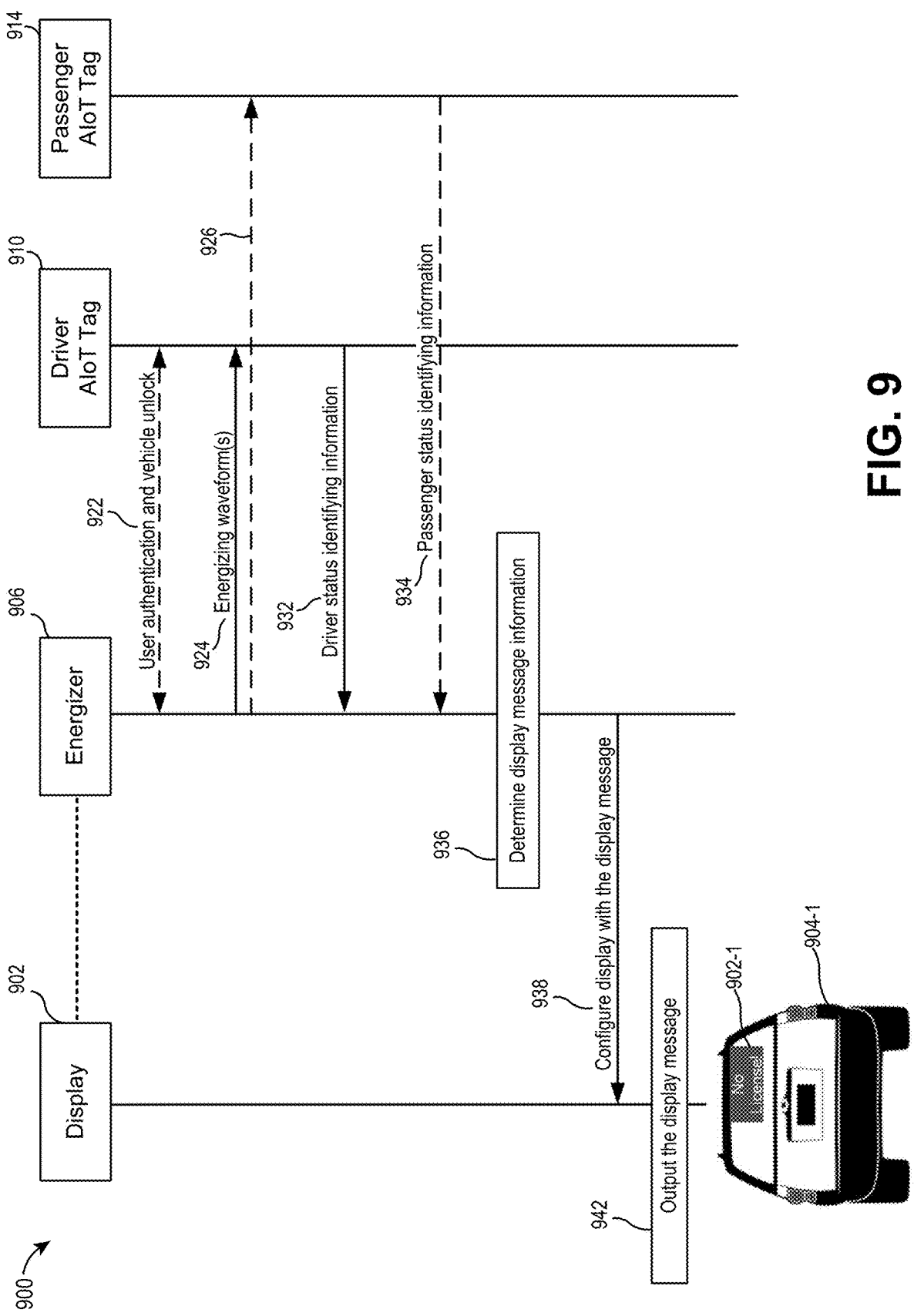
FIG. 9 is a signaling diagram corresponding to a process of wireless communication between a vehicle display, a backscatter energizer associated with the vehicle display, and one or more backscatter tags (e.g., ambient IT tags), in accordance with some examples.

FIG. 9 is a signaling diagram corresponding to a process of wireless communication 900 between a vehicle display 902, a backscatter energizer 906 associated with the vehicle display 902, and one or more backscatter tags 910 and 914 (e.g., ambient IoT (AIoT) tags), in accordance with some examples. In some aspects, the display 902 can be the same as or similar to the display 802 of FIG. 8, and can be included in a vehicle 904-1 that is the same as or similar to the vehicle 804 (and 804-1) of FIG. 8. The display 902 of the signaling diagram of FIG. 9 can be the same as the display 902-1 also shown in FIG. 9 as a rear outward-facing display attached to the vehicle 904-1.

The backscatter energizer 906 can be associated with one or more of the display 902 and the vehicle 904-1. For instance, the backscatter energizer 906 may be included in the display 902, may be included in the vehicle 906-1, or both. The backscatter energizer 906 can be a radio (e.g., RF source or RF transmitter) configured to generate and trans-mit one or more energizing signals or waveforms that can be used by the driver ambient IoT tag 910 (e.g., an AIoT tag associated with and/or carried by or on the person of the driver of the vehicle 904-1) and/or the passenger ambient IoT tag 914 (e.g., an AIoT tag associated with and/or carried by or on the person of a passenger or non-driver of the vehicle 904-1).

In one illustrative example, the display 902 can be con-figured to output a display message (e.g., at block 942) that is determined based on wireless communications and/or signaling between the energizer 906 and one or more AIoT tags (e.g., driver AIoT tag 910, passenger AIoT tag(s) 914, etc.). In some aspects, the wireless communications can be backscatter communications based on energizing signals or waveforms transmitted by a backscatter energizer associated with the vehicle 904-1 and/or associated with the display 902 (e.g., the backscatter energizer 906), where the ener-gizing waveforms are transmitted to interrogate (e.g., read)

one or more AIoT tags associated with the occupants of the vehicle 904-1 in order to determine the respective vehicle occupant identities and the current driver of the vehicle 904-1.

For instance, a first backscatter tag can be associated with (e.g., included within) a driver's license or UE carried by a driver of the vehicle, and may be referred to as the driver AIoT tag 910. A second backscatter tag can be associated with (e.g., included within) a driver's license or UE carried by a passenger of the vehicle, etc., and may be referred to as the passenger AIoT tag 914. In some examples, the wireless communication process 900 of FIG. 9 can be used to perform detection of a student driver in the driver's seat of the vehicle 904-1. For instance, an ambient IoT tag 910 may be included in the driver's license or learner's permit issued to (e.g., and carried by) the student driver, and the backscatter energizer 906 can be used to interrogate or scan for the presence of an ambient IoT tag (e.g., or various other backscatter tags, such as RFID tags, NFC tags, etc.) located in or near the driver's seat of the vehicle.

In some examples, the process 900 can include a user authentication and vehicle unlock 922 that is the same as or similar to the user authentication and vehicle unlock 822 of FIG. 8. Based on successful authentication of at least one user in the vicinity of the vehicle 904-1 (e.g., based on successful authentication of a user who is either the driver associated with driver AIoT tag 910 or the passenger associated with passenger AIoT tag 914), the energizer 906 can be configured to generate and transmit one or more energizing waveforms 924, 926 to scan for and/or interrogate (e.g., read) any AIoT tags or other backscatter tags or devices within range to receive and reply to one of the respective energizing waveforms 924, 926. In some examples, the user authentication and vehicle unlock process 922 can be performed between the vehicle 904-1 and a UE carried by the authenticating user of the vehicle 904-1 (e.g., the owner of the vehicle, which may be the driver associated with driver AIoT tag 910 or a passenger associated with passenger AIoT tag 914, etc.). In some examples, the UE carried by the authenticating user of the vehicle 904-1 can be the same as or similar to the UE 810 of FIG. 8. In some aspects, the UE carried by the authenticating user of the vehicle 904-1 may include or be coupled to the corresponding one of the driver AIoT tag 910 or the passenger AIoT tag 914.

In one illustrative example, the energizer 906 of FIG. 9 can be the same as or similar to one or more of the reader 712, the transmitter 715, and/or the receiver 717 of FIG. 7. For instance, the one or more energizing waveforms 924, 926 generated and transmitted in response to successful user authentication 922 by the energizer 906 of FIG. 9 may be the same as or similar to the carrier wave energizing signal 725 of FIG. 7.

In some aspects, a first energizing waveform 924 can be transmitted from the energizer 906 to the driver's seat location within vehicle 904-1, and used to scan for and interrogate (e.g., read) the driver AIoT tag 910 (e.g., if present). A second energizing waveform 926 can be the same as or similar to the first energizing waveform 924, and can be transmitted from the energizer 906 to one or more passenger seat locations within vehicle 904-1, and used to scan for and interrogate (e.g., read) the passenger AIoT tag 914. In some examples, the energizer 906 can transmit a single energizing waveform that is received by and used to interrogate both the driver AIoT tag 910 and one or more passenger AIoT tags 914.

Based on receiving at least one of the energizing waveforms 924, 926 from the energizer 906, the driver AIoT tag 910 can generate a modulated backscattered signal 932 based on reflecting and modulating the received, downlink energizing signal. Based on receiving at least one of the energizing waveforms 924, 926 from the backscatter energizer 906, the passenger AIoT tag 914 can generate a modulated backscattered signal 934 based on reflecting and modulating the received, downlink energizing signal. In one illustrative example, the respective modulated backscattered signals 932 and 934 can be the same as or similar to the modulated backscattered signal 727 generated by the backscatter device 702 of FIG. 7.

In some examples, the driver AIoT tag 910 is included in a UE and/or driver's license associated with the driver of vehicle 904-1. For instance, the driver AIoT tag 910 may be included in the user's driver's license or learner's permit, and can respond to the energizing signal 924 (e.g., from the backscatter energizer 906 associated with the vehicle display 902) with a backscatter signal 932 that is indicative of the corresponding driver's license information or other driver status identifying information of the driver. The passenger AIoT tag 914 may be included in the passenger's driver's license or learner's permit, smartphone, wearable, UE, etc., and can respond to the energizing signal 926 with a backscatter signal 934 indicative of the corresponding driver's license information or other passenger status identifying information of the passenger (e.g., non-driver occupant of vehicle 904-1).

In one illustrative example, the backscatter signals 932 and 934 (e.g., transmitted by the respective driver ambient IoT tag 910 and passenger ambient IoT tag 914 included in each user's driver's license, learner's permit, smartphone, UE etc.) can be directly indicative of the user's driver status as a fully licensed driver, a partially licensed or qualified driver, a learner's permit driver or student driver, a handicapped driver, a restricted driver, a suspended driver, etc. In another example, the backscatter signal 932 or 934 transmitted by the ambient IoT tag 910 or 914 included in the user's driver's license, learner's permit, smartphone, etc., can transmit metadata or other unique identification information of the respective ambient IoT tag 910 or 914. For instance, the unique identifier of driver AIoT tag 910 can be included in or indicated by the driver status identifying information backscatter signal 932. The unique identifier of passenger AIoT tag 914 can be included in or indicated by the passenger status identifying information backscatter signal 934.

At block 936, the energizer 906 and/or the vehicle 904-1 can analyze the respective driver status identifying information 932 and the respective passenger status identifying information 934 that is backscattered based on the energizing waveforms 924, 926 to determine display message information for output on the vehicle display 902. For instance, the driver's license or driving permission or qualification status information associated with the driver AIoT tag 910 and/or the passenger AIoT tag 914 can be compared to a database of stored or configured user profiles (e.g., driver profiles) associated with and accessible by the vehicle display 902 and/or the vehicle 904-1 and/or the energizer 906, where the user profiles map the unique ambient IoT tag 910, 914 identifiers to corresponding driver status identifying information (e.g., driver's license information, driver qualification information, driving permission information, etc.). Based on determining the respective driver status identifying information for the current driver of the vehicle (e.g., corresponding to driver AIoT tag 910), the vehicle display 902 can be automatically configured (e.g., based on configuration information 938, which can be the same as or similar to the configuration information 836 of FIG. 8) to display or output a corresponding display message or alert at block 942, where the display message or alert is based on the driver status identifying information determined at block 936 and based on the driver status identifying information backscatter signal 932. For instance, based on determining that the current driver of the vehicle 904-1 is a student driver, the vehicle display 902/902-1 can be automatically configured with a "STUDENT DRIVER" message, or various other messages indicative of the driver's status as a student driver.

In some aspects, determining the display message information at block 936 of FIG. 9 can be the same as or similar to determining the display message information at block 834 of FIG. 8. In some examples, configuring the display 902 with the display message using display configuration information 938 of FIG. 9 can be the same as or similar to configuring the display 802 with the display message using display configuration information 836 of FIG. 8. Outputting the display message at block 942 of FIG. 9 can be the same as or similar to outputting the display message at block 838 of FIG. 8.

In some cases, the energizer 906 (e.g., associated with the vehicle display 902) can transmit the energizing waveforms 924 and/or 906 based on using beamforming to direct the respective energizing waveforms 924 and 926 to the driver's seat location or passenger seat location(s) within the vehicle 904-1. The corresponding backscattered signals 932 and 934 received based on transmitting the energizing waveforms 924 and 926, respectively, can be indicative of user identifying information and/or driving status information (e.g., learner's permit or not learner's permit). In some aspects, the transmission of the energizing waveforms 924, 926 to interrogate the driver AIoT tag 910 and/or passenger AIoT tag 914 can be performed based on (e.g., after) the vehicle 904-1 has been unlocked based on successful user authentication and vehicle unlock 922.

In one illustrative example, the systems and techniques can be configured to detect or determine the presence of one or more driver's licenses within the vehicle 904-1. For instance, the presence of a first driver's license can be detected based on receiving a backscatter signal 932 and/or 934 from the driver and/or passenger AIoT tags 910, 914, respectively (e.g., where the driver and passenger AIoT tags 910, 914 are included in the driver's license belonging to the driver and the passenger of the vehicle 904-1, respectively). In some aspects, the absence of a driver's license within the vehicle 904-1 may correspond to the failure to detect or receive a backscattered driver identification signal 932 or 934 in response to the energizing waveforms 924, 926 transmitted by the backscatter energizer 906 of the vehicle 904-1. In one illustrative example, the detected absence of a driver's license in the vehicle 904-1 can be used to trigger a notification directly to the driver of the vehicle 904-1, for instance using an internal display or notification system associated with the vehicle 904-1. The missing driver's license notification can be presented using, for example, the infotainment system 454 of the vehicle computing system 450 associated with vehicle 404 of FIG. 4 (e.g., which can be the same as or similar to the vehicle 904-1 of FIG. 9).

In some aspects, the absence of a driver's license in the vehicle 904-1 can cause the vehicle 904-1 to transmit a notification directly to law enforcement and/or configuring the display 902 with display information 938 indicative of the absence of a driver's license while the vehicle 904-1 is moving. In some cases, the notification to law enforcement can be transmitted using a vehicle communications system that is the same as or similar to the vehicle communications system 458 of FIG. 4. In some examples, the check for the presence of a driver's license within the vehicle 904-1 can be included in the user authentication and vehicle unlock 922 process of FIG. 9. For instance, in examples where the driver's license of the driver includes or is associated with the driver AIoT tag 910, the vehicle 904-1 can be configured to reject the user authentication, vehicle start, vehicle travel or movement, etc., until the driver AIoT tag 910 is detected (e.g., based on the energizer 906 receiving the backscatter signal 932 from the driver AIoT tag 910) and used to infer the presence of the driver's license of the driver.

In some cases, the second energizing waveform 926 transmitted by the energizer 906 can be used to interrogate and scan for the presence of a passenger AIoT tag 914, which may be included in a driver's license of a passenger within the vehicle 904-1. The presence of the passenger's driver's license can be based on the energizer 906 receiving the passenger license information in the backscatter signal 934 that is based on the passenger AIoT tag 914 backscatter modulating the energizing waveform 926 transmitted by energizer 906. In some cases, the check for the presence of the passenger driver's license can additionally be included in the user authentication and vehicle unlock 922, as some jurisdictions may require that a driver on a learner's permit be accompanied in the vehicle by a fully licensed driver. For example, where license presence is checked, validated, or determined as part of the user authentication and vehicle unlock process 922, based on determining that the driver status identifying information 932 is indicative of a learner's permit driver, an additional check may be performed to validate the presence of a passenger driver's license (e.g., passenger AIoT tag 914) of a passenger legally required to accompany the student driver of vehicle 904-1.

Figure 10:
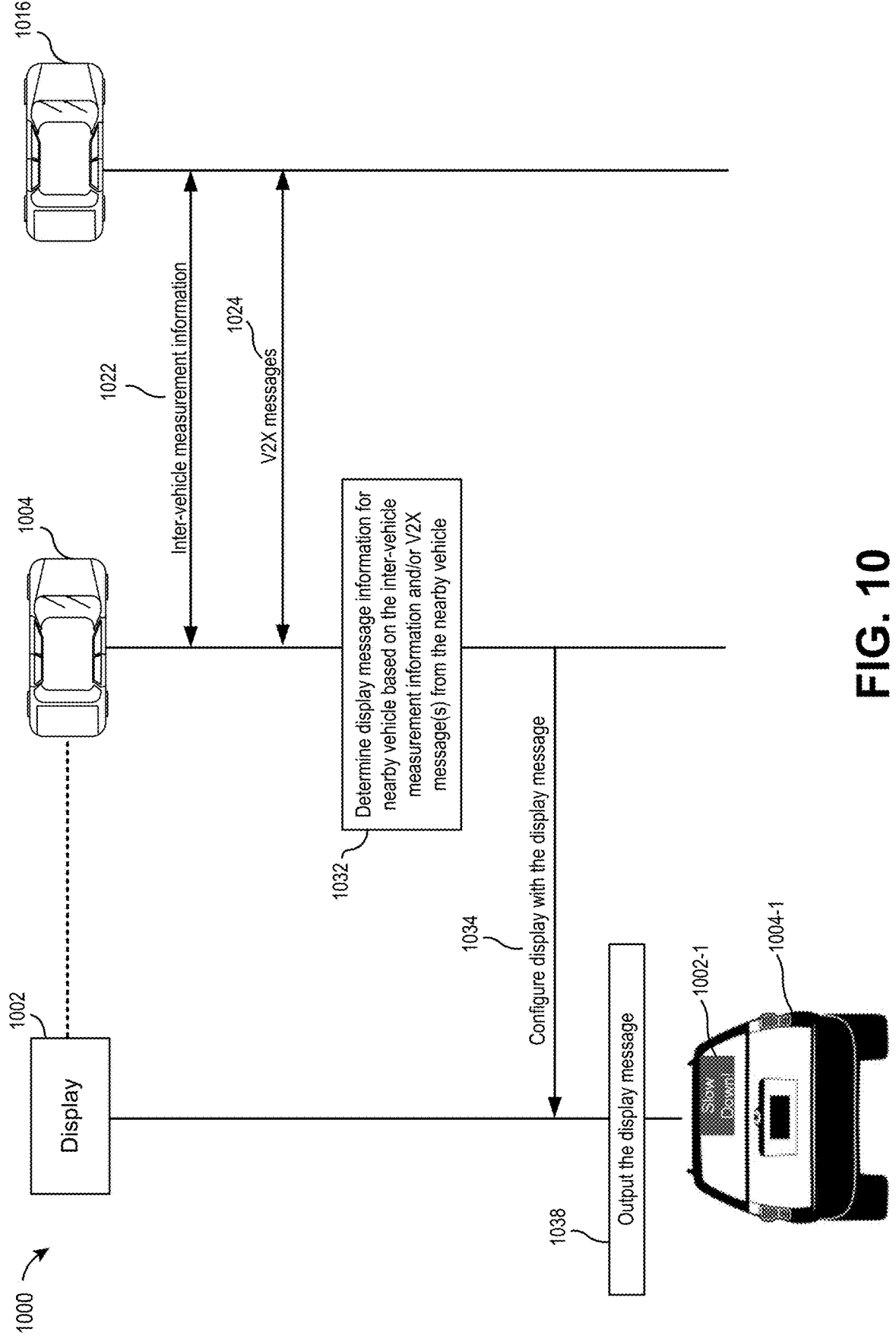
FIG. 10 is a signaling diagram corresponding to a process of wireless communication between a first vehicle, a second vehicle, and a vehicle display of the first vehicle, in accordance with some examples.

FIG. 10 is a signaling diagram corresponding to a process of wireless communication 1000 between a first vehicle 1004, a second vehicle 1008, and a vehicle display 1002 of the first vehicle 1004, in accordance with some examples. In one illustrative example, the display 1002 can be the same as or similar to one or more of the display 802 of FIG. 8 and/or the display 902 of FIG. 9. In some cases, the first vehicle 1004 and the second vehicle 1016 can be of a same or similar type, and for instance, may both be V2X-capable and/or NR-Sidelink-capable vehicles, etc. In some examples, one or more (or both) of first vehicle 1002 and second vehicle 1016 can be the same as or similar to the vehicle 804 and 804-1 of FIG. 8, the vehicle 904-1 of FIG. 9, the vehicle 404 of FIG. 4, etc. The first vehicle 1004 and the vehicle 1004-1 of FIG. 10 can be the same, and the display 1002 and the display 1002-1 of FIG. 10 can be the same.

In some aspects, the systems and techniques described herein can be used to configure the display 1002 of the first vehicle 1004 with an adaptive vehicle display message determined based on one or more inter-vehicle measurements 1022 and/or inter-vehicle communications 1024 performed between the first vehicle 1004 (e.g., the vehicle including or associated with the display 1002) and one or more nearby vehicles (e.g., the second vehicle 1016, and/or various other vehicles within communication range of the first vehicle 1004).

In some aspects, the display 1002 provided on the first vehicle 1004 can be configured with a display message or other alert information based on providing and/or signaling corresponding display configuration information 1034 to the display 1002. In some examples, the display configuration information 1034 of FIG. 10 can be the same as or similar to the display configuration information 836 of FIG. 8 and/or the display configuration information 938 of FIG. 9. Based on the display configuration information indicative of the display message and/or one or more display output parameters (e.g., indicated by the signaled display configuration information 1034 received by display 1002), the display 1002 can be configured to output the display message at block 1038. For instance, outputting the display message at block 1038 of FIG. 10 can be the same as or similar to outputting the display message at block 838 of FIG. 8 and/or outputting the display message at block 942 of FIG. 9, etc.

In some aspects, the process 1000 can include transmitting inter-vehicle measurement information 1022 between at least the first vehicle 1004 and the second vehicle 1016 and/or transmitted one or more V2X or NR-SL messages 1024 between at least the first vehicle 1004 and the second vehicle 1016. In some examples, the transmission of the inter-vehicle measurement information 1022 can be combined with (e.g., included within) the transmission of the one or more V2X messages 1024. For instance, the V2X messages 1024 can be indicative of the inter-vehicle measurement information 1022 associated with the first vehicle 1004 and the second vehicle 1016.

At block 1032, the first vehicle 1004 can determine display message information for presentation to the driver and/or occupants of a nearby vehicle (e.g., the second vehicle 1016), based on the inter-vehicle measurement information 1022 determined or obtained by the first vehicle 1004 and corresponding to then second vehicle 1016, and/or based on one or more V2X messages 1024 received by the first vehicle 1004 from the second vehicle 1016. In some cases, the vehicle display 1002 provided on the first vehicle 1004 can be configured (e.g., using display configuration information 1034) with a display message or other alert information that is determined based on one or more sidelink messages (e.g., NR-SL, etc.) transmitted and/or received by the first vehicle 1004. For instance, the first vehicle 1004 and/or the one or more nearby vehicles (e.g., second vehicle 1016, etc.) may include radar capability to detect inter-vehicle range information, relative velocity information, etc. Based on the inter-vehicle measurements 1022 and/or the one or more V2X or NR-SL messages 1024 received by the first vehicle 1004, the vehicle display 1002 provided on the first vehicle 1004 can be configured to display warning or alert messages to the driver(s) or occupant(s) of the second vehicle 1016 (e.g., outputting a configured display message 1034 for the occupants of the second vehicle 1016 at block 1038). For instance, the outward-facing display 1002 of the first vehicle 1004 can be used to display (e.g., to the driver or occupants of the nearby second vehicle 1016) messages such as "Slow down!" or "Too close!" or "Stop!", etc., based on one or more inter-vehicle measurements 1022 and/or V2X messages 1024 between the first vehicle 1004 and the second vehicle 1016.

In some aspects, the first vehicle 1004 can be configured to automatically trigger or output one or more auditory cues in combination with the configured display messages 1034. In some cases, color coded lighting patterns (e.g., such as flashes of red light, etc.) may also be triggered by the first vehicle 1004 to make the output display message 1038 (e.g., shown being output on the display 1002-1 of the first vehicle 1004-1) more noticeable to the occupants of the nearby second vehicle 1016. In some examples, the exchange of the one or more V2X messages 1024 between the first vehicle 1004 and the second vehicle 1016 can be used to configure one or more messages for display on an internal display (e.g., using a respective infotainment system the same as or similar to the vehicle infotainment system 454 of FIG. 4, etc.) of one or more or both of the first vehicle 1004 and the second vehicle 1016.

In some examples, the inter-vehicle measurement information 1022 and/or the V2X messages 1024 can be used to determine over-speeding by one of the vehicles 1004 and/or 1016. Based on determining an over-speeding condition (e.g., included in the determination of block 1032), the non-speeding vehicle that makes the determination of over-speeding can transmit a notification or report of the speeding vehicle directly to law enforcement. For instance, the speeding notification can be transmitted by the first vehicle 1004 to be indicative of the second vehicle 1016 over-speeding, and may include identifying information of the second vehicle 1016 such as license plate number, images, etc. A speeding notification can also be transmitted by the second vehicle 1016 indicative of the first vehicle 1004 over-speeding, and may include identifying information of the first vehicle 1004 such as license plate number, images, etc. In some aspects, the outward-facing vehicle display 1002 can be configured with a display message 1034 that is indicative of the over-speeding condition and/or is configured to assist nearby law enforcement officers in identifying and apprehending the speeding vehicle. In some cases, various other display messages and display message configurations 1034 can be determined and output on an outward-facing vehicle display 1002, such as display messages that are output 1038 in the event that a vehicle associated with an amber alert or other criminal activity is found or detected (e.g., based on inter-vehicle measurements 1022, visual images, etc.).

In another illustrative example, the systems and techniques can be used to generate adaptive display messages, warnings, alerts, etc., that are based on monitoring information determined for the driver and/or other non-driver occupants of the vehicle (e.g., passengers, animals, etc.). For instance, a vehicle (e.g., vehicle 1004, 1004-1, 1016 of FIG. 10; vehicle 904-1 of FIG. 9; vehicle 804, 804-1 of FIG. 8; vehicle 404 of FIG. 4; etc.) may be configured with one or more driver or occupant monitoring systems that can be used to monitor the health of the driver and/or occupants within the vehicle. For example, the driver or occupant monitoring system can include one or more cameras configured to capture visual input(s) such as image data that can be processed or analyzed to determine vehicle occupant health information. In another example, the driver or occupant monitoring system can include one or more thermal infrared cameras that can be used to perform heat-source detection to detect the presence of one or more living beings within the vehicle (e.g., both human occupants and non-human or animal occupants, etc.). In some cases, the driver or occupant monitoring systems used to configure the vehicle display 1002 with corresponding display messages can include one or more of oxygen sensors, carbon dioxide ($CO_2$) sensors, carbon monoxide (CO) sensors, air quality sensors, etc. In some aspects, a driver and/or passenger occupant of the vehicle (e.g., a driver associated with a driver AIoT tag, such as driver AIoT tag 910 of FIG. 9, a passenger associated with a passenger AIoT tag, such as passenger AIoT tag 914 of FIG. 9, etc.) can be associated with one or more wearable devices that can monitor, sense, and/or determine biometric or health information of the user wearing the wearable device. In some examples, the wearable device of a user can communicate with a UE associated with the same user, and the UE can transmit the user health information to the vehicle for generating corresponding display messages. In another example, the wearable device of a user can communicate with an RF receiver or transceiver included in the vehicle (e.g., including an RF receiver or transceiver included in the vehicle display 1002), in order to transmit the user health information to the vehicle for generating corresponding display messages.

In some examples, the user health information can be used to generate one or more display messages for presentation to other drivers or vehicles on the road or nearby to the vehicle 1004 for which the occupants are monitored (e.g., using an outward facing vehicle display such as display 1002). In some examples, the user health information can be used to generate one or more display messages for presentation to the occupants within the same vehicle 1004 for which the occupants are monitored (e.g., using an inward facing vehicle display the same as or similar to the display 1002, and/or using a vehicle infotainment system the same as or similar to the vehicle infotainment system 454 of FIG. 4). In some cases, the user health monitoring sensors and/or systems used in generating the user health display messages may be included in one or more sensors systems of the vehicle, including vehicle sensor systems that are the same as or similar to the vehicle sensor system(s) 456 of the vehicle computing system 450 implemented by the vehicle 404 of FIG. 4.

In some cases, the one or more driver or occupant monitoring systems can be included in the vehicle 1004 and used to monitor the health, awareness, focus, biometrics, etc., of the driver, occupants or passengers, animals, etc., located within the vehicle 1004. An inward-facing vehicle display and/or an outward-facing vehicle display (e.g., display 1002 or 1002-1 of FIG. 10, etc.) included in the vehicle 1004 can be configured with adaptive display messages 1034 indicative of the current occupant status, warning, or alert information that is determined based on the user health information. For instance, the vehicle occupant health information can be analyzed and used to generate adaptive display messages corresponding to detected instances where the driver of the vehicle is unfit to be driving (e.g., driver is inebriated, falling asleep, losing focus, not responding, etc.). In another example, the adaptive display messages can correspond to the detection of a child, animal, passenger, etc., that has been left inside of the vehicle after the vehicle has been turned off and parked with the driver exiting (e.g., detect a child or pet left inside a closed vehicle, etc.). In some cases, the adaptive display messages can correspond to the detection of a medical emergency experienced by an occupant of the vehicle, for which immediate medical attention is needed. In another example, the adaptive display messages may correspond to the detection of a car-jacking or other criminal activity. For instance, the owner, driver, occupant, etc., of a vehicle can discretely use the vehicle display 1002 to alert other nearby vehicles, drivers, pedestrians, etc., on the outside of the vehicle to the ongoing criminal activity inside of the vehicle. In one illustrative example, the display 1002 can be configured with display configuration information 1034 indicative of an emergency or SOS message, such as 'Help!', "Contact<phone number>!", or 'Emergency, Give Way!', etc., among various others. In some cases, the display 1002 can output color and/or visual patterns to increase the attention paid by nearby drivers to the presented display message 1034.

Figure 11:
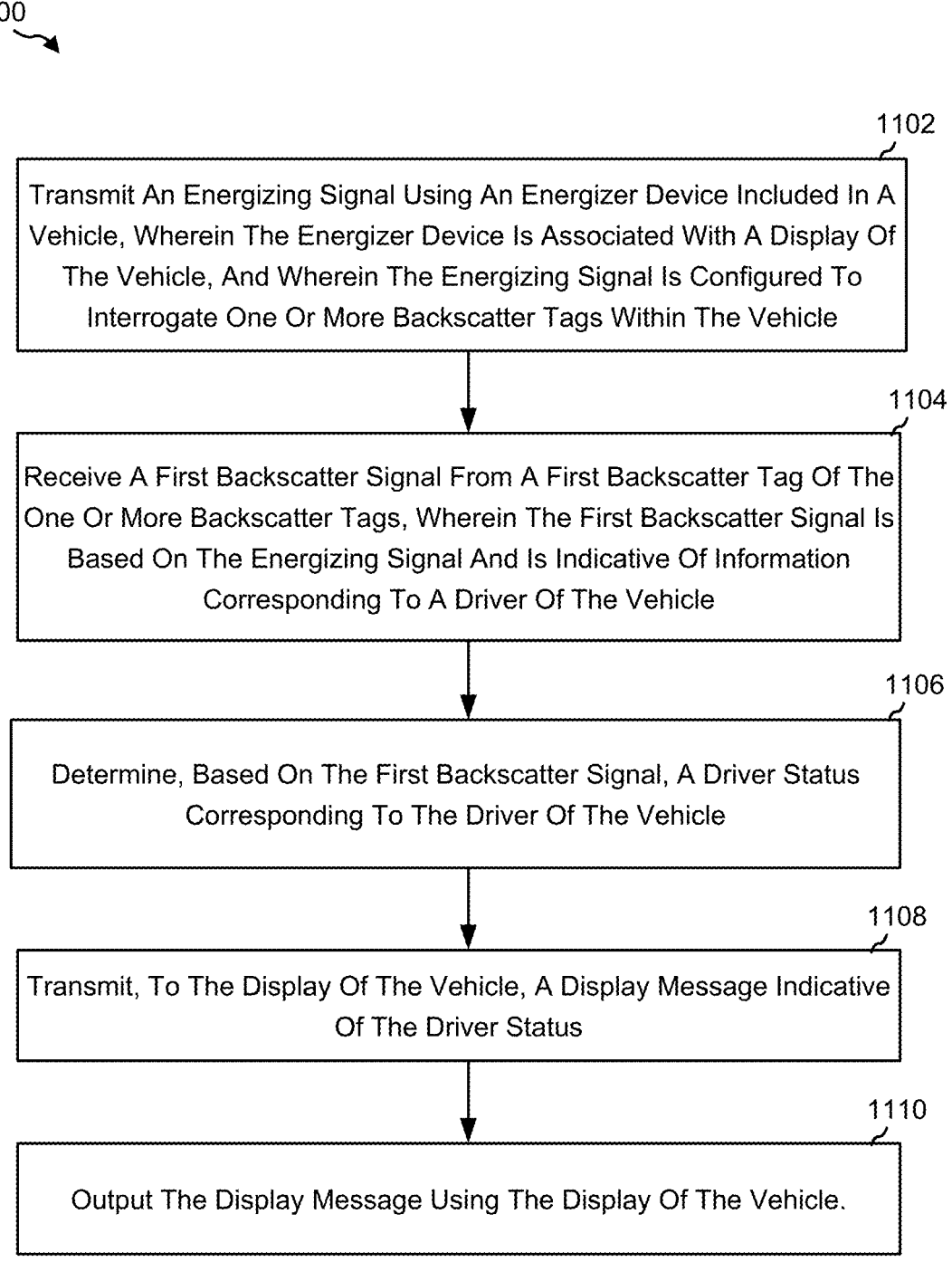
FIG. 11 is a flow chart illustrating an example of a process for wireless communication, in accordance with some examples.

FIG. 11 is a flow chart illustrating an example of a process 1100 for wireless communications. At block 1102, the process 1100 can include transmitting an energizing signal using an energizer device included in a vehicle, wherein the energizer device is associated with a display of the vehicle, and wherein the energizing signal is configured to interrogate one or more backscatter tags within the vehicle. For instance, the energizing signal can be an energizing signal transmitted by an energizer device such as the backscatter reader 610a of FIG. 6A. In some examples, the energizer device included in the vehicle can be the same as or similar to one or more of the reader 712, the transmitter 715, and/or the receiver 717 of FIG. 7. In some cases, the energizer device can be the same as or similar to the energizer 906 of FIG. 9. In some cases, the energizing signal can be the same as or similar to the carrier wave energizing signal 725 of FIG. 7, the energizing waveform 924 and/or 926 of FIG. 9, etc.

The vehicle can be the same as or similar to the vehicle 804 of FIG. 8, 904-1 of FIG. 9, 1004 or 1016 of FIG. 10, etc. In some cases, the display of the vehicle is an outward-facing display attached to the vehicle. For instance, the display of the vehicle can be the same as or similar to the display 802 of FIG. 8, 902 of FIG. 9, 1002 of FIG. 10, etc.

The one or more backscatter tags within the vehicle can be the same as or similar to the backscatter tag 650a of FIG. 6A, the backscatter device 600 of FIG. 6B, the backscattering device 702 of FIG. 7, the driver AIoT tag 910 and/or passenger AIoT tag 914 of FIG. 9, etc.

In some cases, the energizing signal is transmitted in response to authenticating a user equipment (UE) associated with the driver to unlock the vehicle. For instance, the UE can be the same as or similar to the UE 810 of FIG. 8 and authenticating the UE can be the same as or similar to the user authentication and vehicle unlock process 822 of FIG. 8. In some examples, the first backscatter tag is included in the UE associated with the driver.

In some examples, the one or more backscatter tags within the vehicle includes a first backscatter tag associated with a driver of the vehicle and corresponding to a first identifier, and a second backscatter tag associated with a passenger or non-driver occupant of the vehicle and corresponding to a second identifier different from the first identifier. For instance, the first backscatter tag can be the same as or similar to the driver AIoT tag 910 of FIG. 9 and the second backscatter tag can be the same as or similar to the passenger AIoT tag 914 of FIG. 9. In some cases, the first backscatter tag comprises a first ambient Internet of Things (IoT) tag associated with a driver's license of the driver of the vehicle, and the second backscatter tag comprises a second ambient IoT tag associated with a driver's license of the passenger of the vehicle. In some examples, the one or more backscatter tags comprises one or more ambient Internet of Things (IoT) tags.

In some cases, transmitting the energizing signal includes transmitting a first energizing signal towards a driver's seat location within the vehicle using beamforming. In some examples, transmitting the energizing signal further includes transmitting a second energizing signal towards a passenger seat location within the vehicle using beamforming. For instance, the energizing waveform 924 of FIG. 9 can be transmitted towards a driver's seat location within the vehicle 904-1 using beamforming, and the energizing waveform 926 of FIG. 9 can be transmitted towards a passenger seat location within the vehicle 904-1 using beamforming.

At block 1104, the process 1100 can include receiving a first backscatter signal from a first backscatter tag of the one or more backscatter tags, wherein the first backscatter signal is based on the energizing signal and is indicative of information corresponding to a driver of the vehicle.

For instance, the first backscatter signal can be the same as or similar to the modulated backscattered signal 727 of FIG. 7 and/or the backscatter signal 932 of FIG. 9, etc. In some examples, the first backscatter signal is indicative of a unique identifier of the first backscatter tag. The unique identifier of the first backscatter tag can be mapped to one or more of a user profile of the driver of the vehicle or driver's license information of the driver of the vehicle. In some cases, a first user profile includes driver's license information mapping the first identifier of the first ambient IoT tag to the driver's license of the driver of the vehicle, and a second user profile includes driver's license information mapping the second identifier of the second ambient IoT tag to the driver's license of the passenger of the vehicle.

At block 1106, the process 1100 can include determining, based on the first backscatter signal, a driver status corresponding to the driver of the vehicle. In some cases, the driver status is determined based on one or more of a user profile or the driver's license information of the driver of the vehicle. For example, the driver status can be determined based on the driver status identifying information 932 of FIG. 9 indicated by the backscatter signal from driver AIoT tag 910 in response to the energizing waveform 924 transmitted by energizing device 906 of FIG. 9. In some examples, the driver status can be determined the same as or similar to the driver status determination of block 832 of FIG. 8.

At block 1108, the process 1100 can include transmitting, to the display of the vehicle, a display message indicative of the driver status. At block 1110, the process 1100 can include outputting the display message using the display of the vehicle. For example, the display message can be the same as or similar to the display message shown on display 802-1 of FIG. 8 and determined at block 834 of FIG. 8, the display message shown on display 902-1 of FIG. 9 and determined at block 936 of FIG. 9, and/or the display message shown on display 1002-1 of FIG. 10, etc. In some cases, the display message is indicative of a student driver status determined for the driver of the vehicle based on the first backscatter signal. In some examples, the display message is indicative of a disabled driver status determined for the driver of the vehicle based on the first backscatter signal.

In some cases, the process 1100 can further include receiving a second backscatter signal from a second backscatter tag of the one or more backscatter tags, wherein the second backscatter signal is based on the energizing signal and is indicative of information corresponding to a passenger of the vehicle. The second backscatter signal can be used to determine respective driver's license information corresponding to the passenger of the vehicle. In some cases, the display message can be generated based on the driver status corresponding to the driver of the vehicle and the respective driver's license information corresponding to the passenger of the vehicle.

In some cases, the process 1100 can further include determining inter-vehicle measurement information corresponding to the vehicle and a second vehicle. For instance, the inter-vehicle measurement information can be the same as or similar to the inter-vehicle measurement information 1022 of FIG. 10, determined between the vehicles 1004 and 1016. In some cases, the process 1100 can further include comparing the inter-vehicle measurement information to one or more configured thresholds. In some examples, the process 1100 can further include transmitting, to the display of the vehicle, a warning display message indicative of one or more prompts to a driver of the second vehicle. For instance, the warning display message can be the same as or similar to a display message information determined at block 1032 of FIG. 10 and configured for display at block 1034 of FIG. 10. The process 1100 can further include outputting the warning display message using the display of the vehicle, the same as or similar to block 1038 of FIG. 10.

In some cases, the inter-vehicle measurement information is indicative of one or more of an inter-vehicle relative range estimation or an inter-vehicle relative velocity estimation. In some examples, the process 1100 further includes receiving, from a second vehicle, one or more sidelink messages. For example, the one or more sidelink messages can be the same as or similar to the V2X messages 1024 of FIG. 10. The process 1100 can further include transmitting, to the display of the vehicle, a display message determined based on the one or more sidelink messages and outputting the display message using the display of the vehicle. In some cases, the one or more sidelink messages comprise vehicle-to-everything (V2X) messages or New Radio (NR) Sidelink (NR-SL) messages. In some examples, the one or more sidelink messages include text information for outputting the display message. In some examples, the one or more sidelink messages are indicative of inter-vehicle measurement information between the vehicle and the second vehicle, the inter-vehicle measurement information including one or more of an inter-vehicle relative range estimation or an inter-vehicle relative velocity estimation.

FIG. 12 is a flow chart illustrating another example of a process 1200 for wireless communications. At block 1202, the process 1200 can include receiving, from a user equipment (UE) associated with a driver of a vehicle, authentication information of the driver. For instance, the UE can be the same as or similar to the UE 810 of FIG. 8 and the vehicle can be the same as or similar to the vehicle 804 of FIG. 8. In some cases, the authentication information of the driver can be the same as or similar to the user authentication information 822 of FIG. 8.

At block 1204, the process 1200 can include determining a user profile corresponding to the driver of the vehicle based on the authentication information, wherein the user profile is indicative of driver's license information associated with the driver. For instance, block 1204 of process 1200 can be the same as or similar to block 824 of FIG. 8.

At block 1206, the process 1200 can include determining, based on one or more of the user profile or the driver's license information, a driver status corresponding to the driver. For instance, block 1206 can be the same as or similar to block 832 of FIG. 8.

At block 1208, the process 1200 can include transmitting, to a display attached to the vehicle, a display message indicative of the driver status. For instance, block 1208 can be the same as or similar to block 834 and/or block 836 of FIG. 8. At block 1210, the process 1200 can include outputting the display message using the display of the vehicle. For instance, block 1210 can be the same as or similar to block 838 of FIG. 8.

In some cases, the process 1200 can further include initiating a relative positioning session with the UE associated with the driver, based on successful authentication of the authentication information. For instance, the relative positioning session can be initiated based on the relative positioning session initiation message(s) 826 of FIG. 8. The process 1200 can further include determining, based on one or more relative positioning signals received from the UE, a trajectory of the UE. For example, the one or more relative positioning signals can be included in the UE relative positioning information 828 of FIG. 8. The process 1200 can further include determining the UE is associated with the driver of the vehicle based on comparing the trajectory of the UE and configured location information of a driver's seat within the vehicle.

The wireless communication device (e.g., UE) may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 1100 of FIG. 11, the process 1200 of FIG. 12, and/or other processed described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 of FIG. 11, the process 1200 of FIG. 12, and/or other processed described herein may be illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 of FIG. 11, the process 1200 of FIG. 12, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
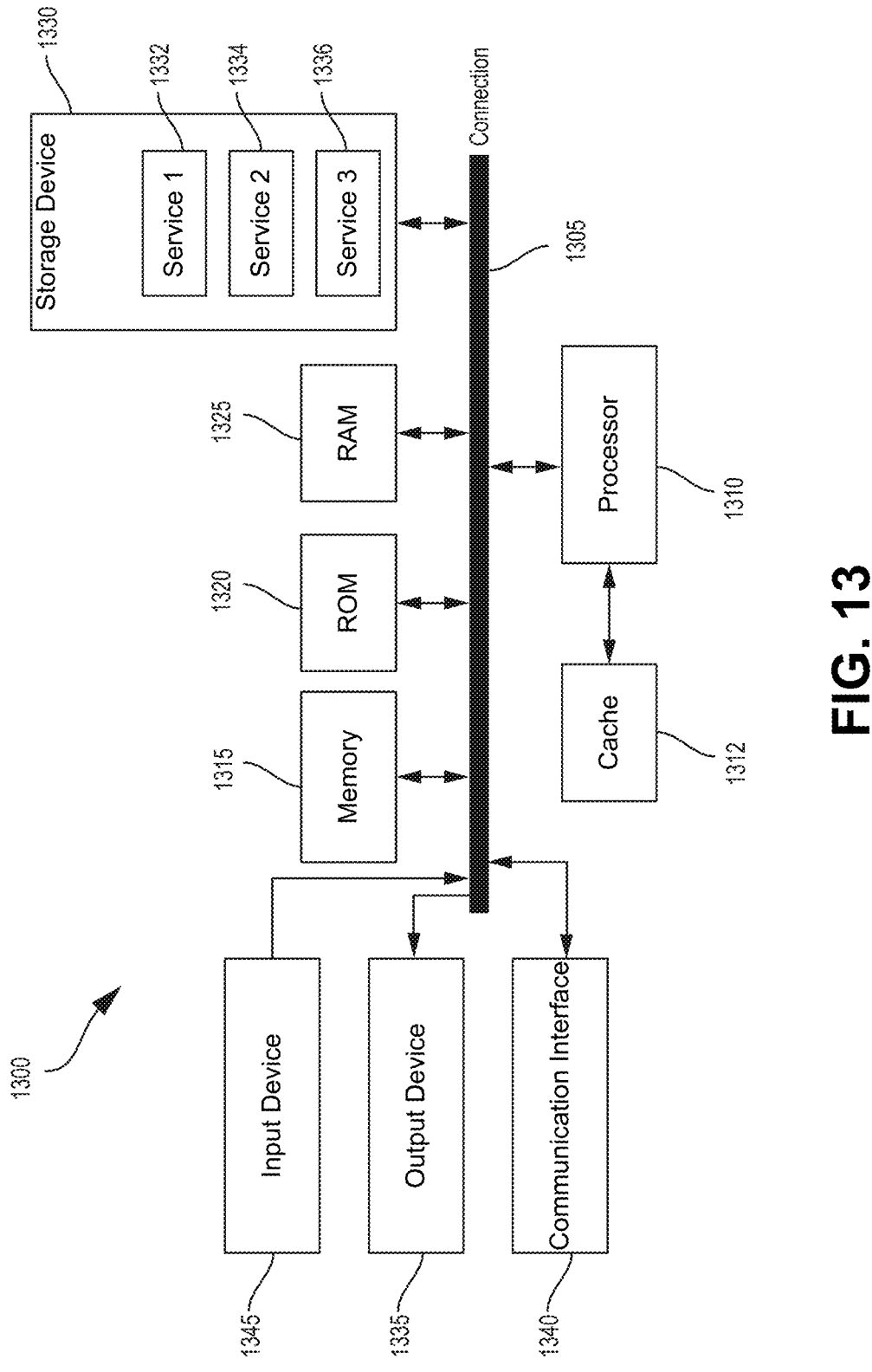
FIG. 13 illustrates an example computing system, in accordance with some examples.

FIG. 13 is a block diagram illustrating an example of a computing system 1300, which may be employed by the disclosed systems and techniques. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method of wireless communication, the method comprising: transmitting an energizing signal using an energizer device included in a vehicle, wherein the energizer device is associated with a display of the vehicle, and wherein the energizing signal is configured to interrogate one or more backscatter tags within the vehicle; receiving a first backscatter signal from a first backscatter tag of the one or more backscatter tags, wherein the first backscatter signal is based on the energizing signal and is indicative of information corresponding to a driver of the vehicle; determining, based on the first backscatter signal, a driver status corresponding to the driver of the vehicle; transmitting, to the display of the vehicle, a display message indicative of the driver status; and outputting the display message using the display of the vehicle.

Aspect 2. The method of Aspect 1, wherein the first backscatter signal is indicative of a unique identifier of the first backscatter tag, and wherein the unique identifier of the first backscatter tag is mapped to one or more of a user profile of the driver of the vehicle or driver's license information of the driver of the vehicle.

Aspect 3. The method of Aspect 2, wherein the driver status is determined based on one or more of the user profile or the driver's license information of the driver of the vehicle.

Aspect 4. The method of any of Aspects 1 to 3, wherein the energizing signal is transmitted in response to authenticating a user equipment (UE) associated with the driver to unlock the vehicle.

Aspect 5. The method of Aspect 4, wherein the first backscatter tag is included in the UE associated with the driver.

Aspect 6. The method of any of Aspects 1 to 5, further comprising: receiving a second backscatter signal from a second backscatter tag of the one or more backscatter tags, wherein the second backscatter signal is based on the energizing signal and is indicative of information corresponding to a passenger of the vehicle; determining, based on the second backscatter signal, respective driver's license information corresponding to the passenger of the vehicle; and generating the display message based on the driver status corresponding to the driver of the vehicle and the respective driver's license information corresponding to the passenger of the vehicle.

Aspect 7. The method of any of Aspects 1 to 6, wherein the one or more backscatter tags within the vehicle includes: a first backscatter tag associated with a driver of the vehicle and corresponding to a first identifier; and a second backscatter tag associated with a passenger or non-driver occupant of the vehicle and corresponding to a second identifier different from the first identifier.

Aspect 8. The method of Aspect 7, wherein: the first backscatter tag comprises a first ambient Internet of Things (IoT) tag associated with a driver's license of the driver of the vehicle; and the second backscatter tag comprises a second ambient IoT tag associated with a driver's license of the passenger of the vehicle.

Aspect 9. The method of Aspect 8, wherein: a first user profile includes driver's license information mapping the first identifier of the first ambient IoT tag to the driver's license of the driver of the vehicle; and a second user profile includes driver's license information mapping the second identifier of the second ambient IoT tag to the driver's license of the passenger of the vehicle.

Aspect 10. The method of any of Aspects 1 to 9, wherein the one or more backscatter tags comprises one or more ambient Internet of Things (IoT) tags.

Aspect 11. The method of any of Aspects 1 to 10, wherein the display of the vehicle is an outward-facing display attached to the vehicle.

Aspect 12. The method of any of Aspects 1 to 11, wherein transmitting the energizing signal includes: transmitting a first energizing signal towards a driver's seat location within the vehicle using beamforming.

Aspect 13. The method of Aspect 12, wherein transmitting the energizing signal further includes: transmitting a second energizing signal towards a passenger seat location within the vehicle using beamforming.

Aspect 14. The method of any of Aspects 1 to 13, further comprising: determining inter-vehicle measurement information corresponding to the vehicle and a second vehicle; comparing the inter-vehicle measurement information to one or more configured thresholds; transmitting, to the display of the vehicle, a warning display message indicative of one or more prompts to a driver of the second vehicle; and outputting the warning display message using the display of the vehicle.

Aspect 15. The method of Aspect 14, wherein the inter-vehicle measurement information is indicative of one or more of an inter-vehicle relative range estimation or an inter-vehicle relative velocity estimation.

Aspect 16. The method of any of Aspects 1 to 15, further comprising: receiving, from a second vehicle, one or more sidelink messages; transmitting, to the display of the vehicle, a display message determined based on the one or more sidelink messages; and outputting the display message using the display of the vehicle.

Aspect 17. The method of Aspect 16, wherein the one or more sidelink messages comprise vehicle-to-everything (V2X) messages or New Radio (NR) Sidelink (NR-SL) messages.

Aspect 18. The method of any of Aspects 16 to 17, wherein the one or more sidelink messages include text information for outputting the display message.

Aspect 19. The method of any of Aspects 16 to 18, wherein the one or more sidelink messages are indicative of inter-vehicle measurement information between the vehicle and the second vehicle, the inter-vehicle measurement information including one or more of an inter-vehicle relative range estimation or an inter-vehicle relative velocity estimation.

Aspect 20. The method of any of Aspects 1 to 19, wherein the display message is indicative of a student driver status determined for the driver of the vehicle based on the first backscatter signal.

Aspect 21. The method of any of Aspects 1 to 20, wherein the display message is indicative of a disabled driver status determined for the driver of the vehicle based on the first backscatter signal.

Aspect 22. A method of wireless communication, the method comprising: receiving, from a user equipment (UE) associated with a driver of a vehicle, authentication information of the driver; determining a user profile corresponding to the driver of the vehicle based on the authentication information, wherein the user profile is indicative of driver's license information associated with the driver; determining, based on one or more of the user profile or the driver's license information, a driver status corresponding to the driver; transmitting, to a display attached to the vehicle, a display message indicative of the driver status; and outputting the display message using the display of the vehicle.

Aspect 23. The method of Aspect 22, further comprising: initiating a relative positioning session with the UE associated with the driver, based on successful authentication of the authentication information; determining, based on one or more relative positioning signals received from the UE, a trajectory of the UE; and determining the UE is associated with the driver of the vehicle based on comparing the trajectory of the UE and configured location information of a driver's seat within the vehicle.

Aspect 24. An apparatus for wireless communication, comprising: at least one memory; and at least one processor coupled to the at least one memory, wherein the at least one processor is configured to: transmit an energizing signal using an energizer device included in a vehicle, wherein the energizer device is associated with a display of the vehicle, and wherein the energizing signal is configured to interrogate one or more backscatter tags within the vehicle; receive a first backscatter signal from a first backscatter tag of the one or more backscatter tags, wherein the first backscatter signal is based on the energizing signal and is indicative of information corresponding to a driver of the vehicle; determine, based on the first backscatter signal, a driver status corresponding to the driver of the vehicle; transmit, to the display of the vehicle, a display message indicative of the driver status; and output the display message using the display of the vehicle.

Aspect 25. The apparatus of Aspect 24, wherein the first backscatter signal is indicative of a unique identifier of the first backscatter tag, and wherein the unique identifier of the first backscatter tag is mapped to one or more of a user profile of the driver of the vehicle or driver's license information of the driver of the vehicle.

Aspect 26. The apparatus of Aspect 25, wherein the driver status is determined based on one or more of the user profile or the driver's license information of the driver of the vehicle.

Aspect 27. The apparatus of Aspect 24, wherein the energizing signal is transmitted in response to authenticating a user equipment (UE) associated with the driver to unlock the vehicle.

Aspect 28. The apparatus of Aspect 27, wherein the first backscatter tag is included in the UE associated with the driver.

Aspect 29. The apparatus of Aspect 24, wherein the at least one processor is further configured to: receive a second backscatter signal from a second backscatter tag of the one or more backscatter tags, wherein the second backscatter signal is based on the energizing signal and is indicative of information corresponding to a passenger of the vehicle; determine, based on the second backscatter signal, respective driver's license information corresponding to the passenger of the vehicle; and generate the display message based on the driver status corresponding to the driver of the vehicle and the respective driver's license information corresponding to the passenger of the vehicle.

Aspect 30. The apparatus of Aspect 24, wherein the one or more backscatter tags within the vehicle includes: a first backscatter tag associated with a driver of the vehicle and corresponding to a first identifier, wherein the first backscatter tag comprises a first ambient Internet of Things (IoT) tag associated with a driver's license of the driver of the vehicle; and a second backscatter tag associated with a passenger or non-driver occupant of the vehicle and corresponding to a second identifier different from the first identifier, wherein the second backscatter tag comprises a second ambient IoT tag associated with a driver's license of the passenger of the vehicle.

Aspect 31. The apparatus of any of Aspects 29 to 30, wherein: a first user profile includes driver's license information mapping the first identifier of the first ambient IoT tag to the driver's license of the driver of the vehicle; and a second user profile includes driver's license information mapping the second identifier of the second ambient IoT tag to the driver's license of the passenger of the vehicle.

Aspect 32. The apparatus of any of Aspects 24 to 31, wherein the one or more backscatter tags comprises one or more ambient Internet of Things (IoT) tags.

Aspect 33. The apparatus of any of Aspects 24 to 32, wherein the display of the vehicle is an outward-facing display attached to the vehicle.

Aspect 34. The apparatus of any of Aspects 24 to 33, wherein, to transmit the energizing signal, the at least one processor is configured to: transmit a first energizing signal towards a driver's seat location within the vehicle using beamforming.

Aspect 35. The apparatus of Aspect 34, wherein, to transmit the energizing signal, the at least one processor is configured to: transmit a second energizing signal towards a passenger seat location within the vehicle using beamforming.

Aspect 36. The apparatus of any of Aspects 24 to 35, wherein the at least one processor is further configured to: determine inter-vehicle measurement information corresponding to the vehicle and a second vehicle; compare the inter-vehicle measurement information to one or more configured thresholds; transmit, to the display of the vehicle, a warning display message indicative of one or more prompts to a driver of the second vehicle; and output the warning display message using the display of the vehicle.

Aspect 37. The apparatus of Aspect 36, wherein the inter-vehicle measurement information is indicative of one or more of an inter-vehicle relative range estimation or an inter-vehicle relative velocity estimation.

Aspect 38. The apparatus of any of Aspects 24 to 37, wherein the at least one processor is further configured to: receive, from a second vehicle, one or more sidelink messages; transmit, to the display of the vehicle, a display message determined based on the one or more sidelink messages; and output the display message using the display of the vehicle.

Aspect 39. The apparatus of Aspect 38, wherein the one or more sidelink messages comprise vehicle-to-everything (V2X) messages or New Radio (NR) Sidelink (NR-SL) messages.

Aspect 40. The apparatus of any of Aspects 38 to 39, wherein the one or more sidelink messages include text information for outputting the display message.

Aspect 41. The apparatus of any of Aspects 38 to 40, wherein the one or more sidelink messages are indicative of inter-vehicle measurement information between the vehicle and the second vehicle, the inter-vehicle measurement information including one or more of an inter-vehicle relative range estimation or an inter-vehicle relative velocity estimation.

Aspect 42. The apparatus of any of Aspects 24 to 41, wherein the display message is indicative of a student driver status determined for the driver of the vehicle based on the first backscatter signal.

Aspect 43. The apparatus of any of Aspects 24 to 42, wherein the display message is indicative of a disabled driver status determined for the driver of the vehicle based on the first backscatter signal.

Aspect 44. An apparatus for wireless communication, comprising: at least one memory; and at least one processor coupled to the at least one memory, wherein the at least one processor is configured to: receive, from a user equipment (UE) associated with a driver of a vehicle, authentication information of the driver; determine a user profile corresponding to the driver of the vehicle based on the authentication information, wherein the user profile is indicative of driver's license information associated with the driver; determine, based on one or more of the user profile or the driver's license information, a driver status corresponding to the driver; transmit, to a display attached to the vehicle, a display message indicative of the driver status; and output the display message using the display of the vehicle.

Aspect 45. The apparatus of Aspect 44, wherein the at least one processor is further configured to: initiate a relative positioning session with the UE associated with the driver, based on successful authentication of the authentication information; determine, based on one or more relative positioning signals received from the UE, a trajectory of the UE; and determine the UE is associated with the driver of the vehicle based on comparing the trajectory of the UE and configured location information of a driver's seat within the vehicle.

Aspect 46. A non-transitory computer-readable storage medium comprising instructions stored thereon which, when executed by at least one processor, causes the at least one processor to perform operations according to any of Aspects 1 to 21.

Aspect 47. A non-transitory computer-readable storage medium comprising instructions stored thereon which, when executed by at least one processor, causes the at least one processor to perform operations according to any of Aspects 22 to 23.

Aspect 48. A non-transitory computer-readable storage medium comprising instructions stored thereon which, when executed by at least one processor, causes the at least one processor to perform operations according to any of Aspects 24 to 43.

Aspect 49. A non-transitory computer-readable storage medium comprising instructions stored thereon which, when executed by at least one processor, causes the at least one processor to perform operations according to any of Aspects 44 to 45.

Aspect 50. An apparatus comprising one or more means for performing operations according to any of Aspects 1 to 21.

Aspect 51. An apparatus comprising one or more means for performing operations according to any of Aspects 22 to 23.

Aspect 52. An apparatus comprising one or more means for performing operations according to any of Aspects 24 to 43.

Aspect 53. An apparatus comprising one or more means for performing operations according to any of Aspects 44 to 45.

Aspect 54. An apparatus for wireless communication, comprising: at least one memory; and at least one processor coupled to the at least one memory, wherein the at least one processor is configured to perform operations according to any of Aspects 1 to 21.

Aspect 55. An apparatus for wireless communication, comprising: at least one memory; and at least one processor coupled to the at least one memory, wherein the at least one processor is configured to perform operations according to any of Aspects 22 to 23.

What is claimed is:

1. An apparatus for wireless communication, comprising:

at least one memory; and at least one processor coupled to the at least one memory, wherein the at least one processor is configured to:

transmit an energizing signal using an energizer device included in a vehicle, wherein the energizer device is associated with a display of the vehicle, and wherein the energizing signal is configured to interrogate one or more backscatter tags within the vehicle, wherein the one or more backscatter tags within the vehicle includes at least:

a first backscatter tag associated with a driver of the vehicle and corresponding to a first identifier; and a second backscatter tag associated with a passenger or non-driver occupant of the vehicle and corresponding to a second identifier different from the first identifier;

receive a first backscatter signal from the first backscatter tag of the one or more backscatter tags, wherein the first backscatter signal is based on the energizing signal and is indicative of information corresponding to the driver of the vehicle;

determine, based on the first backscatter signal, a driver status corresponding to the driver of the vehicle;

transmit, to the display of the vehicle, a display message indicative of the driver status; and output the display message using the display of the vehicle.

2. The apparatus of claim 1, wherein the first backscatter signal is indicative of a unique identifier of the first backscatter tag, and wherein the unique identifier of the first backscatter tag is mapped to one or more of a user profile of the driver of the vehicle or driver's license information of the driver of the vehicle.

3. The apparatus of claim 2, wherein the driver status is determined based on one or more of the user profile or the driver's license information of the driver of the vehicle.

4. The apparatus of claim 1, wherein the energizing signal is transmitted in response to authenticating a user equipment (UE) associated with the driver to unlock the vehicle.

5. The apparatus of claim 4, wherein the first backscatter tag is included in the UE associated with the driver.

6. The apparatus of claim 1, wherein the at least one processor is further configured to:

receive a second backscatter signal from the second backscatter tag of the one or more backscatter tags, wherein the second backscatter signal is based on the energizing signal and is indicative of information corresponding to the passenger of the vehicle;

determine, based on the second backscatter signal, respective driver's license information corresponding to the passenger of the vehicle; and generate the display message based on the driver status corresponding to the driver of the vehicle and the respective driver's license information corresponding to the passenger of the vehicle.

7. The apparatus of claim 1, wherein:

the first backscatter tag comprises a first ambient Internet of Things (IOT) tag associated with a driver's license of the driver of the vehicle; and the second backscatter tag comprises a second ambient IoT tag associated with a driver's license of the passenger of the vehicle.

8. The apparatus of claim 1, wherein, to transmit the energizing signal, the at least one processor is configured to:

transmit a respective energizing signal towards a driver's seat location within the vehicle using beamforming.

9. The apparatus of claim 8, wherein, to transmit the energizing signal, the at least one processor is further configured to:

transmit a second energizing signal towards a passenger seat location within the vehicle using beamforming.

10. The apparatus of claim 1, wherein the at least one processor is further configured to:

determine inter-vehicle measurement information corresponding to the vehicle and a second vehicle;

compare the inter-vehicle measurement information to one or more configured thresholds;

transmit, to the display of the vehicle, a warning display message indicative of one or more prompts to a driver of the second vehicle; and output the warning display message using the display of the vehicle.

11. The apparatus of claim 10, wherein the inter-vehicle measurement information is indicative of one or more of an inter-vehicle relative range estimation or an inter-vehicle relative velocity estimation.

12. The apparatus of claim 1, wherein the at least one processor is further configured to:

receive, from a second vehicle, one or more sidelink messages;

transmit, to the display of the vehicle, a display message determined based on the one or more sidelink messages; and output the display message using the display of the vehicle.

13. The apparatus of claim 12, wherein the one or more sidelink messages comprise vehicle-to-everything (V2X) messages or New Radio (NR) Sidelink (NR-SL) messages, and wherein the one or more sidelink messages include text information for outputting the display message.

14. An apparatus for wireless communication, comprising:

at least one memory; and at least one processor coupled to the at least one memory, wherein the at least one processor is configured to:

receive, from a user equipment (UE), authentication information of a driver of a vehicle;

initiate a relative positioning session with the UE based on successful authentication of the authentication information;

determine the UE is associated with the driver of the vehicle based on comparing a trajectory of the UE and configured location information of a driver's seat within the vehicle, wherein the trajectory of the UE is based on one or more relative positioning signals received from the UE;

determine a user profile corresponding to the driver of the vehicle based on the authentication information, wherein the user profile is indicative of driver's license information associated with the driver;

determine, based on one or more of the user profile or the driver's license information, a driver status corresponding to the driver;

transmit, to a display attached to the vehicle, a display message indicative of the driver status; and output the display message using the display of the vehicle.

15. A method of wireless communication, the method comprising:

transmitting an energizing signal using an energizer device included in a vehicle, wherein the energizer device is associated with a display of the vehicle, and wherein the energizing signal is configured to interrogate one or more backscatter tags within the vehicle, wherein the one or more backscatter tags within the vehicle includes at least:

a first backscatter tag associated with a driver of the vehicle and corresponding to a first identifier; and a second backscatter tag associated with a passenger or non-driver occupant of the vehicle and corresponding to a second identifier different from the first identifier;

receiving a first backscatter signal from the first backscatter tag of the one or more backscatter tags, wherein the first backscatter signal is based on the energizing signal and is indicative of information corresponding to a driver of the vehicle;

determining, based on the first backscatter signal, a driver status corresponding to the driver of the vehicle;

transmitting, to the display of the vehicle, a display message indicative of the driver status; and outputting the display message using the display of the vehicle.

16. The method of claim 15, wherein the first backscatter signal is indicative of a unique identifier of the first backscatter tag, and wherein the unique identifier of the first backscatter tag is mapped to one or more of a user profile of the driver of the vehicle or driver's license information of the driver of the vehicle.

17. The method of claim 16 wherein the driver status is determined based on one or more of the user profile or the driver's license information of the driver of the vehicle.

18. The method of claim 15, wherein the energizing signal is transmitted in response to authenticating a user equipment (UE) associated with the driver to unlock the vehicle.

19. The method of claim 18, wherein the first backscatter tag is included in the UE associated with the driver.

20. The method of claim 15, further comprising:

receiving a second backscatter signal from the second backscatter tag of the one or more backscatter tags, wherein the second backscatter signal is based on the energizing signal and is indicative of information corresponding to the passenger of the vehicle;

determining, based on the second backscatter signal, respective driver's license information corresponding to the passenger of the vehicle; and generating the display message based on the driver status corresponding to the driver of the vehicle and the respective driver's license information corresponding to the passenger of the vehicle.

21. The method of claim 16, wherein:

the first backscatter tag comprises a first ambient Internet of Things (IoT) tag associated with a driver's license of the driver of the vehicle; and the second backscatter tag comprises a second ambient IoT tag associated with a driver's license of the passenger of the vehicle.

22. The method of claim 21, wherein:

a first user profile includes driver's license information mapping the first identifier of the first ambient IoT tag to the driver's license of the driver of the vehicle; and a second user profile includes driver's license information mapping the second identifier of the second ambient IoT tag to the driver's license of the passenger of the vehicle.

23. The method of claim 15, wherein the one or more backscatter tags comprises one or more ambient Internet of Things (IOT) tags.

24. The method of claim 15, wherein transmitting the energizing signal includes:

transmitting a first energizing signal towards a driver's seat location within the vehicle using beamforming.

25. The method of claim 24, wherein transmitting the energizing signal further includes:

transmitting a second energizing signal towards a passenger seat location within the vehicle using beamforming.

26. The method of claim 15, further comprising:

determining inter-vehicle measurement information corresponding to the vehicle and a second vehicle;

comparing the inter-vehicle measurement information to one or more configured thresholds;

transmitting, to the display of the vehicle, a warning display message indicative of one or more prompts to a driver of the second vehicle; and outputting the warning display message using the display of the vehicle.

27. A method of wireless communication, the method comprising:

receiving, from a user equipment (UE), authentication information of a driver of a vehicle;

initiating a relative positioning session with the UE based on successful authentication of the authentication information;

determining the UE is associated with the driver of the vehicle based on comparing a trajectory of the UE and configured location information of a driver's seat within the vehicle, wherein the trajectory of the UE is based on one or more relative positioning signals received from the UE;

determining a user profile corresponding to the driver of the vehicle based on the authentication information, wherein the user profile is indicative of driver's license information associated with the driver;

determining, based on one or more of the user profile or the driver's license information, a driver status corresponding to the driver;

transmitting, to a display attached to the vehicle, a display message indicative of the driver status; and outputting the display message using the display of the vehicle.

\* \* \* \* \*